United States Patent
Kiji

(10) Patent No.: US 6,438,532 B1
(45) Date of Patent: *Aug. 20, 2002

(54) ADJUSTMENT RULE GENERATING AND CONTROL METHOD AND APPARATUS

(75) Inventor: Junichi Kiji, Urayasu (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/012,584

(22) Filed: Jan. 23, 1998

(30) Foreign Application Priority Data

Jan. 25, 1997 (JP) .............................. 9-026073

(51) Int. Cl.⁷ .............................. G06F 17/00
(52) U.S. Cl. .............................. 706/45; 706/46; 706/47; 706/48; 706/59
(58) Field of Search .............................. 706/45, 46, 47, 706/48, 59

(56) References Cited

U.S. PATENT DOCUMENTS

| | | | |
|---|---|---|---|
| 4,730,259 A | | 3/1988 | Gallant ........................ 706/16 |
| 4,754,410 A | * | 6/1988 | Leech et al. ................... 706/45 |
| 4,864,490 A | * | 9/1989 | Nomoto et al. ............. 364/157 |
| 4,903,192 A | * | 2/1990 | Saito et al. ................. 364/157 |
| 5,179,634 A | * | 1/1993 | Matsunaga et al. ........... 706/59 |
| 5,325,505 A | * | 6/1994 | Hoffecker et al. ........... 395/425 |
| 5,394,322 A | * | 2/1995 | Hansen ........................ 364/148 |
| 5,414,798 A | * | 5/1995 | Nigawara et al. ............. 706/59 |
| 5,471,677 A | * | 11/1995 | Imanaka ...................... 395/600 |
| 5,477,444 A | * | 12/1995 | Bhat et al. .................. 364/152 |
| 5,555,409 A | * | 9/1996 | Leenstra et al. ............ 395/600 |
| 5,668,928 A | * | 9/1997 | Groner ........................ 704/243 |
| 5,761,389 A | * | 6/1998 | Maeda et al. ................. 706/59 |

FOREIGN PATENT DOCUMENTS

| | | |
|---|---|---|
| EP | 0 233 071 | 8/1987 |
| EP | 649254 A1 * | 4/1995 |
| JP | 59-77504 | 5/1984 |
| JP | 63-106802 | 5/1988 |
| JP | 2-211537 | 8/1990 |
| JP | 4-200810 | 7/1992 |
| JP | 5-257695 | 10/1993 |
| JP | 7-191706 | 7/1995 |
| JP | 7-237256 | 9/1995 |

OTHER PUBLICATIONS

Walburn et al, "Automatic Knowledge Acquisition for an Expert System for Distillation", Colloquium on Expert Systems in Process Control, IEE, 1988.*

Walburn et al., Automated acquisition of knowledge for an expert system for proccess control, IEE Processings, Nov. 1989.

* cited by examiner

Primary Examiner—George B. Davis
(74) Attorney, Agent, or Firm—Foley & Lardner

(57) ABSTRACT

An adjustment control method and apparatus of this invention assume that a dependency relationship table representing qualitative characteristics, in which manipulated variables are classified in units of change patterns of controlled variables, and are characterized in that an adjustment rule for adjustment is generated. An adjustment control method and apparatus of this invention is characterized in that it is determined whether the current object situation exhibits an exceptional behavior (vibration/saturation), on the basis of selection of an adjusted controlled variable and a manipulated variable obtained from an automatically generated adjustment rule and a past operation in response to an occasionally output deviation. If it is determined that no exceptional behavior is observed, the instruction of the generated adjustment rule is performed, otherwise, the correction amount of the. manipulated variable which is input to the object to be adjusted is given assuming that a predetermined input operation is performed.

14 Claims, 14 Drawing Sheets

ADJUSTMENT RULE GENERATING AND CONTROL METHOD AND APPARATUS

BACKGROUND OF THE INVENTION

The present invention relates to an adjustment rule generating method and apparatus for generating an adjustment rule for appropriately and easily adjusting an input to a multiple-input/output system having nonlinear characteristics to obtain a desired output from the system, and an adjustment control method and apparatus for adjusting the input to the system using the generated adjustment rule.

In an adjustment operation at a plant, a device production line, or a maintenance operation, when a certain element in the system is adjusted, a plurality of other elements vary upon adjustment, so it is often difficult to properly adjust all elements.

How to adjust an input to obtain a desired output is a general problem. To solve this problem, various means have been implemented conventionally.

In fact, the problem of an adjustment parameter (to be simply referred to as a parameter hereinafter) and the output is often concomitant with the original input/output relationship. For this reason, an effective result can hardly be obtained.

As reasons for this, the following three main factors are considered.

1. Complex correlation between the parameter and the output
2. Nonlinearity of the parameter and output
3. Maldistribution of data Both the parameter and the output are generally multidimensional rather than one-dimensional (variable) and have complex causality. The relationship between the parameter and the output is not linear. Resultant data is small in quantity or maldistributed, so the characteristics between the parameter and the output cannot be sufficiently described using such data. It can be supposed that these factors make the problem difficult to solve.

To solve this problem, not only means based on the theory of linear mathematics but also means reflecting the far-sighted knowledge or intuition of persons who have been concerned in actual adjustment have been used. For example, a method using fuzzy inference or qualitative causality reasoning is used.

The fuzzy inference can be effective for a system having nonlinear characteristics. However, the fuzzy inference is regarded eventually "successful" only when the membership function or adjustment rule can be appropriately defined.

Generally, the fuzzy theory is applied to a nonlinear system. However, analogical reasoning can hardly be made because the response from an object is not linear. In addition, trial and error in system identification also tends to be cumbersome. Even when the system can be identified using a nonlinear model, the input amount for adjustment (manipulated variable for control) is hard to calculate because of the nonlinear model. This results in a difficulty in setting the membership function or adjustment rule. Furthermore, it cannot be guaranteed that the initial rule is still effective for a variation in system characteristics.

Essentially, this also applies to qualitative causality reasoning. Once the causality is clarified, analysis is automatically performed by a computer. However, data in checking the causality depends on human determination, like the fuzzy inference. More specifically, even when data is to be semi-automatically processed and modeled, the human data determination reference must be defined in advance. In this respect, the qualitative causality reasoning is essentially identical to the fuzzy inference (e.g., Jpn. Pat. Appln. KOKAI Publication No. 7-191706).

In reasoning based on causality, normally, the current state is analyzed on the basis of past data (past events). This processing requires a large quantity of past data. This method is convenient when a relatively large plant (system) is operated for a long time. However, when an individual difference between objects is assumed as in adjusting parameters of individual products on a production line, or when adjustment is to be made in response to an environmental change, the number of data is limited because adjustment cannot always depend on other individual data. Therefore, adjustment can hardly be performed using the method based on the conventional event data.

Reasoning does not suffice for adjustment. Unlike system observation based on two references, e.g., faulty diagnosis for checking whether the interior of a system is faulty or not (subsequent processing is left to human operations), some action must be taken for the system after situation determination in the control system.

BRIEF SUMMARY OF THE INVENTION

The present invention has been made in consideration of the above situation, and has as its object to provide a system having the following characteristic features.

1. Adjustment is performed while sampling data
2. A large quantity of data is not required in advance
3. Nonlinear characteristics can be coped with.

More specifically, the present invention has as its object to provide an adjustment rule generating method and apparatus for generating an adjustment rule to adjust an object having multiple variables (multiple-input/output system) whose correlation has complex nonlinear characteristics.

It is another object of the present invention to provide an adjustment control method and apparatus for adjusting an object in accordance with a generated adjustment rule.

According to the present invention, the adjustment operation can be appropriately standardized and automated.

The adjustment rule generating method and apparatus of the present invention are characterized in that a table (dependency relationship table) representing qualitative characteristics is assumed in which inputs (to be referred to as manipulated variables hereinafter) are classified in units of change patterns of outputs (to be referred to as controlled variables hereinafter) having influence, and an operation procedure (to be referred to as an adjustment rule hereinafter) for adjustment is generated.

The adjustment control method and apparatus according to the present invention are characterized in that it is determined whether the current object situation exhibits an exceptional behavior (vibration/saturation), on the basis of an instruction (selection of an adjusted controlled variable and a manipulated variable) obtained from an automatically generated adjustment rule and a past operation in response to an occasionally output deviation. If it is determined that no exceptional behavior is observed, the instruction of the generated adjustment rule is executed; otherwise, the correction amount of the manipulated variable which is input to the object to be adjusted is given assuming that a predetermined input operation is performed.

(1) An adjustment rule generating apparatus which determines the manipulated variable of the adjustment object or sets the value of a variable parameter (the variable parameter will not particularly be discriminated from the manipulated variable hereinafter) of an adjustment object such that a controlled variable within an allowable range can be obtained, is characterized by comprising adjustable controlled variable selection means for receiving a change in controlled variable corresponding to each manipulated variable of the adjustment object and qualitative feature data of a change difference between controlled variables and defining some manipulated variables which can be independently adjusted from the feature data in units of controlled variables, and adjustment rule format generating means for converting adjustable controlled variable data output from the adjustable controlled variable selection means in units of manipulated variables into a predetermined format and outputting the format as an adjustment procedure.

(2) The adjustment rule generating apparatus of arrangement (1) is characterized in that the change in controlled variable corresponding to each manipulated variable of the adjustment object is defined by input data (manipulated variable characteristics and input/output dependency relationship table; to be referred to as a dependency table hereinafter) as binary data which describes whether each manipulated variable affects the controlled variable and binary data of a change pattern given by the manipulated variable to the controlled variable and expressing the qualitative feature data of the change difference between controlled variables.

(3) An adjustment control apparatus for performing a proportional operation is characterized by comprising deviation data generating means for calculating a deviation of a controlled variable of an adjustment object and outputting the deviation, adjustment rule storage means for receiving the controlled variable deviation obtained from the deviation data generating means and storing an adjustment rule obtained by the apparatus of arrangement (1) or (2), application rule selection means for receiving the controlled variable deviation calculated by the deviation data generating means and the adjustment rule stored in the adjustment rule storage means, selecting a manipulated variable to be adjusted, and defining the selected manipulated variable as an application rule, and manipulated variable determination means for determining a correction amount of the manipulated variable selected by the application rule selection means with reference to the controlled variable deviation as a predetermined proportional amount of the deviation of the controlled variable corresponding to the manipulated variable defined by the application rule.

(4) The adjustment control apparatus of arrangement (3) which performs a proportional operation and nonlinear avoidance is characterized by further comprising adjustment history data storage means for recording/updating adjustment history data (adjustment count, manipulated variable, controlled variable deviation, and the like), and in that the manipulated variable determination means refers to the controlled variable deviation and the adjustment history data stored in the adjustment history data storage means in accordance with the application rule selected by the application rule selection means to determine the correction amount of the manipulated variable of the application rule or a manipulated variable other than the manipulated variable as a proportional amount of the controlled variable deviation or a relative difference from another controlled variable deviation, or independently of the proportional amount, newly stores the determined manipulated variable or controlled variable deviation data referred to in determining the manipulated variable in the adjustment history data storage means, and updates the adjustment history data.

(5) The adjustment control apparatus of arrangement (4) which performs a test operation and nonlinear avoidance is characterized in that the application rule determination means also discriminates between test adjustment and actual adjustment for identifying characteristics of the object with reference to the adjustment history data stored in the adjustment history data storage means, and the manipulated variable determination means refers to data obtained from the adjustment history data storage means and the current controlled variable deviation of the adjustment object to determine a manipulated variable for test adjustment or actual adjustment, newly stores the determined manipulated variable or controlled variable deviation data referred to in determining the manipulated variable in the adjustment history data storage means, and updates the adjustment history data.

(6) An adjustment possibility evaluation apparatus is characterized by comprising an input unit for inputting the adjustment rule obtained from the adjustment rule generating apparatus of arrangement (1) or (2), rule candidate initial setting means for generating some adjustment rules in which manipulated variables and controlled variables are in one-to-one correspondence, controlled variable selection means for selecting a controlled variable to check whether adjustment is enabled for each candidate rule set by the rule candidate initial setting means, corresponding manipulated variable search means for searching for a manipulated variable which corresponds to the controlled variable selected by the controlled variable selection means and can adjust the controlled variable, rule candidate generating means for storing the candidate rule as a rule candidate when all the controlled variables can be adjusted on the basis of the candidate rule set by the rule candidate initial setting means, and rule group generating means for outputting a rule group while omitting the same rule candidate stored in the rule candidate generating means.

(7) An adjustment rule candidate generating apparatus for preparing a dependency table and an adjustment rule is characterized by comprising dependency table candidate generating means for generating some dependency table candidates defined in arrangement (3) from actual input/output data of the adjustment object, adjustment rule generating means of arrangement (3), which receives each dependency table candidate to acquire an adjustment rule corresponding to the dependency table candidate, and dependency table/rule candidate storage means for storing the adjustment rule obtained from the adjustment rule generating apparatus in correspondence with the dependency table candidate.

In the adjustment rule generating apparatus of arrangement (1), the change in controlled variable corresponding to each manipulated variable of the adjustment object and qualitative feature data of a change difference between controlled variables are input to the adjustable controlled variable selection means, the adjustable controlled variable selection means defines some manipulated variables which can be independently adjusted in units of controlled variables from the received feature data and outputs adjustable controlled variable data representing the relationship between the manipulated variable and the controlled variable, and the adjustment rule format generating means converts the adjustable controlled variable data output from the adjustable controlled variable selection means in units of manipulated variables into a predetermined format and outputs adjustment procedure data (adjustment rule).

In the arrangement (2), the change in controlled variable corresponding to each manipulated variable of the adjustment object is defined by input data (manipulated variable characteristics and input/output dependency relationship table; to be referred to as a dependency table hereinafter) as binary data which describes whether each manipulated variable affects the controlled variable and binary data of a change pattern given by the manipulated variable to the controlled variable and expressing the qualitative feature data of the change difference between controlled variables, the adjustable controlled variable selection means defines some manipulated variables which can be independently adjusted in units of controlled variables from the received feature data and outputs adjustable controlled variable data representing the relationship between the manipulated variable and the controlled variable, and the adjustment rule format generating means converts the adjustable controlled variable data output from the adjustable controlled variable selection means in units of manipulated variables into a predetermined format and outputs adjustment procedure data (adjustment rule).

In the adjustment control apparatus of arrangement (3) which performs a proportional operation, the deviation data generating means calculates a deviation of a controlled variable of an adjustment object, the adjustment rule storage means stores an adjustment rule obtained by the adjustment rule generating apparatus of arrangement (1) or (2), the application rule selection means receives the controlled variable deviation and the adjustment rule stored in the adjustment rule storage means, selects a manipulated variable to be adjusted, and outputs it as an application rule, and the manipulated variable determination means determines a correction amount of the manipulated variable selected by the application rule selection means with reference to the controlled variable deviation as a predetermined proportional amount of the deviation of the controlled variable corresponding to the manipulated variable defined by the application rule.

In the adjustment control apparatus of arrangement (4) which performs a proportional operation and nonlinear avoidance, the deviation data generating means calculates a deviation of a controlled variable of the adjustment object, the adjustment history data storage means records/updates adjustment history data (adjustment count, manipulated variable, controlled variable deviation, and the like), the application rule selection means determines an application rule from the adjustment rules for adjustment, and the manipulated variable determination means refers to the controlled variable deviation and the adjustment history data stored in the adjustment history data storage means to determine the correction amount of the manipulated variable according to the application rule or a manipulated variable other than the manipulated variable as a proportional amount of the controlled variable deviation or a relative difference from another controlled variable deviation, or independently of the proportional amount, newly stores the determined manipulated variable or controlled variable deviation data referred to in determining the manipulated variable in the adjustment history data storage means, and updates the adjustment history data.

In the adjustment control apparatus of arrangement (5) which performs a test operation and nonlinear avoidance, the deviation data generating means calculates a deviation of a controlled variable of the adjustment object, the application rule determination means discriminates between test adjustment and actual adjustment for identifying characteristics of the object with reference to the adjustment history data stored in the adjustment history data storage means, and the manipulated variable determination means refers to data obtained from the adjustment history data storage means and the current controlled variable deviation of the adjustment object to determine a manipulated variable for test adjustment or actual adjustment, newly stores the determined manipulated variable or controlled variable deviation data referred to in determining the manipulated variable in the adjustment history data storage means, and updates the adjustment history data.

In the adjustment possibility evaluation apparatus of arrangement (6), the adjustment rule obtained from the adjustment rule generating apparatus of arrangement (1) or (2) is obtained as an input, the rule candidate initial setting means generates some adjustment rules in which manipulated variables and controlled variables are in one-to-one correspondence, the controlled variable selection means selects a controlled variable to check whether adjustment is enabled for each candidate rule set by the rule candidate initial setting means, the corresponding manipulated variable search means searches for a manipulated variable which corresponds to the controlled variable selected by the controlled variable selection means and can adjust the controlled variable, the rule candidate generating means stores the candidate rule as a rule candidate when all the controlled variables can be adjusted on the basis of the candidate rule set by the rule candidate initial setting means, and the rule group generating means outputs a rule group while omitting the same rule candidate stored in the rule candidate generating means.

In the adjustment rule candidate generating apparatus of arrangement (7) which prepares a dependency table and an adjustment rule, the dependency table candidate generating means generates some dependency table candidates defined in arrangement (3) from actual input/output data of the adjustment object, the adjustment rule generating apparatus of arrangement (3) receives each dependency table candidate and generates an adjustment rule corresponding to the dependency table candidate, and the dependency table/rule candidate storage means stores the adjustment rule obtained from the adjustment rule generating apparatus in correspondence with the dependency table candidate.

According to the present invention, there is also provided an adjustment rule generating apparatus which determines a second data group such that a first data group corresponding to a predetermined object has a desired value, characterized by comprising adjustable controlled variable selection means for obtaining a change pattern in units of outputs of controlled variables affected by the manipulated variable using actual data of the object, receiving, as an input, feature data representing qualitative characteristics classified in accordance with the change pattern, and defining some manipulated variables which can adjust one or more controlled variables including the controlled variable, in units of controlled variables, on the basis of the feature data and the influence of the manipulated variable and the controlled variable, and adjustment rule format generating means for converting the adjustable controlled variable data output from the adjustable controlled variable selection means into a predetermined format in units of manipulated variables on the basis of the feature data and the influence of the manipulated variable and the controlled variable and outputting the format as an adjustment procedure.

There is also provided an adjustment rule generating apparatus which determines a second data group such that a first data group corresponding to a predetermined object has a desired value, characterized by comprising adjustable controlled variable selection means for receiving a change in controlled variable corresponding to each manipulated variable of the object and qualitative feature data of a change difference between controlled variables and defining one or more manipulated variables which can adjust one or more controlled variables including the controlled variable, in units of controlled variables, on the basis of the feature data and the influence of the manipulated variable and the controlled variable, and adjustment rule format generating means for converting the adjustable controlled variable data output from the adjustable controlled variable selection means into a predetermined format in units of manipulated variables on the basis of the feature data and the influence of the manipulated variable and the controlled variable and outputting the format as an adjustment procedure.

The change in controlled variable corresponding to each manipulated variable of the adjustment. object is defined by input data as binary data which describes whether each manipulated variable affects the controlled variable and binary data of a change pattern given by the manipulated variable to the controlled variable and expressing the qualitative feature data of the change difference between controlled variables.

An adjustment possibility evaluation apparatus comprises rule candidate initial setting means for receiving an adjustment rule obtained from one of the adjustment rule generating apparatuses and generating some adjustment rules in which manipulated variables and controlled variables are in one-to-one correspondence, controlled variable selection means for selecting a controlled variable to check whether adjustment is enabled for each candidate rule set by the rule candidate initial setting means, corresponding manipulated variable search means for searching for a manipulated variable which corresponds to the controlled variable selected by the controlled variable selection means and capable of adjusting the controlled variable, rule candidate generating means for storing the candidate rule as a rule candidate when all the controlled variables can be adjusted on the basis of the candidate rule set by the rule candidate initial setting means, and rule group generating means for outputting a rule group while omitting the same rule candidate stored in the rule candidate generating means.

There is also provided an adjustment rule generating method of determining a second data group such that a first data group corresponding to a predetermined object has a desired value, characterized by comprising on the basis of data obtained on the basis of the object, obtaining predetermined first data affected by predetermined second data and change characteristics between the predetermined first data, selecting specific one of the first data, which has change characteristics between outputs capable of correcting the change characteristics between first data, and determining specific second data which can correspond to the selected specific first data from the second data group.

According to the present invention, there is also provided an adjustment rule generating method of determining a second data group such that a first data group corresponding to a predetermined object has a desired value, characterized by comprising receiving a change in controlled variable corresponding to each manipulated variable of the object and qualitative feature data of a change difference between controlled variables and defining one or more manipulated variables which can adjust one or more controlled variables including the controlled variable, in units of controlled variables, on the basis of the feature data and the influence of the manipulated variable and the controlled variable, converting the obtained adjustable controlled variable data into a predetermined format in units of manipulated variables on the basis of the feature data and the influence of the manipulated variable and the controlled variable and outputting the format as an adjustment procedure, calculating a deviation of the controlled variable of the object and outputting the deviation, receiving a controlled variable deviation obtained from the output and storing an obtained adjustment rule, receiving the calculated controlled variable deviation and the stored adjustment rule, selecting a manipulated variable to be adjusted, and defining the manipulated variable as an application rule, and determining a correction amount of the manipulated variable selected by the application rule selection unit with reference to the controlled variable deviation as a predetermined proportional amount of the deviation of the controlled variable corresponding to the manipulated variable defined by the application rule.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

The embodiments of the present invention will be described below with reference to the accompanying drawing.

In the present invention, an input (manipulated variable) for each element is given to an object to be adjusted or controlled, and an output as the operation result of the object in response to the given input is obtained in units of elements. The change pattern of, e.g., two outputs given by the input (manipulated variable) is checked.

Figure 18A:
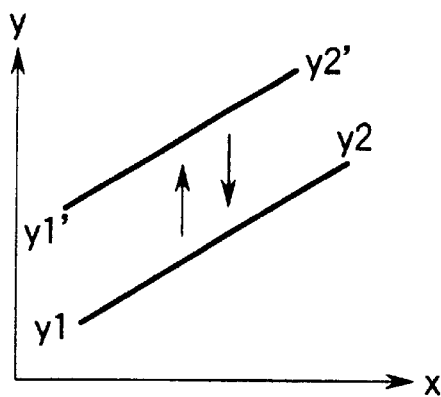
FIG. 18A is a graph showing the change pattern of two outputs.
Figure 18B:
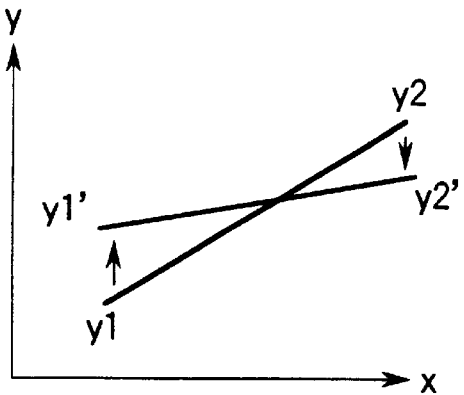
FIG. 18B is a graph showing the change pattern of two outputs.
Figure 18C:
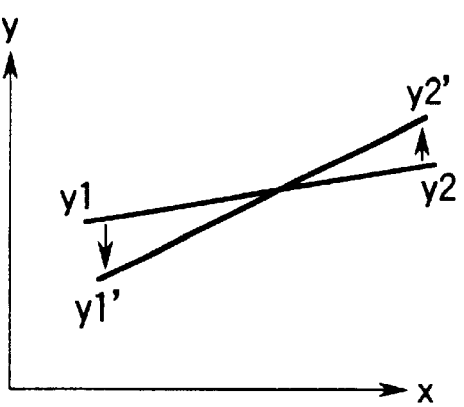
FIG. 18C is a graph showing the change pattern of two outputs.

More specifically, it is checked whether the two outputs change in the direction of same sign (offset change: FIG. 18A) or change in directions of different signs (gradient change; a change with gradient: FIGS. 18B and 18C).

In addition, the dependency relationship between various inputs and outputs of the object to be adjusted or controlled is analyzed and represented as a table, and information of the change pattern is added to this table.

Two inputs are selected from the table representing the dependency relationship, and the degree of influence between the input and output is detected on the basis of the change pattern. With this process, the element for which the input must be changed to perform most stable control or adjustment as desired is checked.

Figure 1:
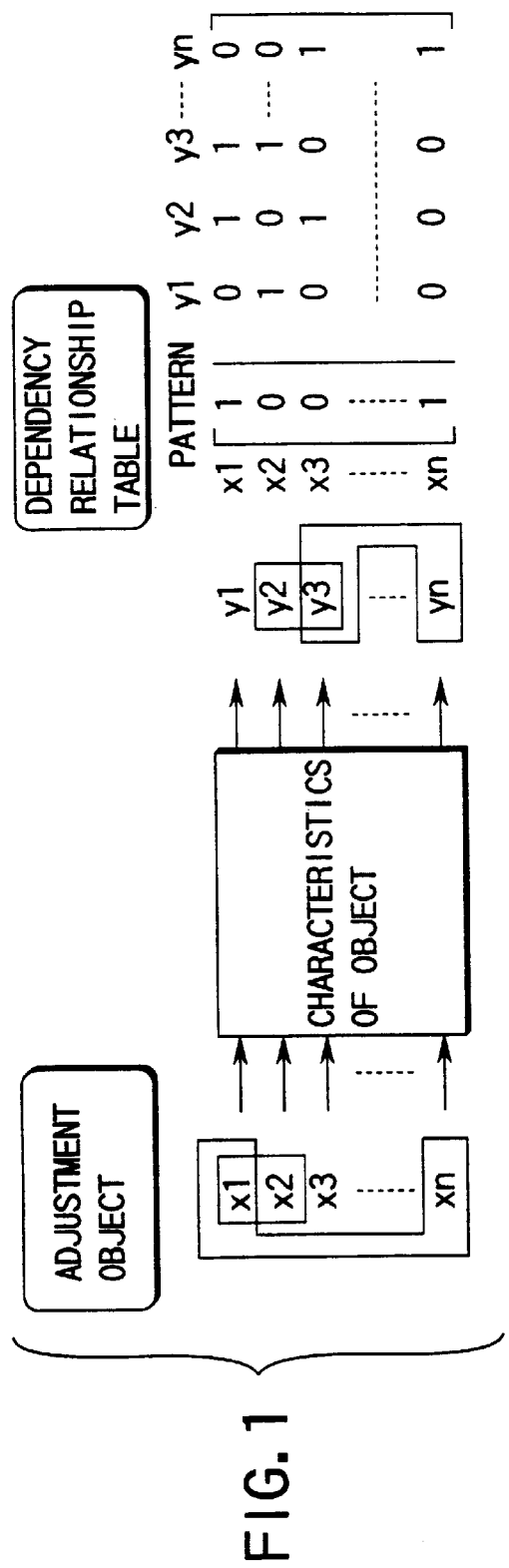
FIG. 1 is a view schematically showing the relationship between an input and an output in the present invention.

FIG. 1 is a view schematically showing the relationship between an input and an output.

The adjustment rule generating apparatus of the present invention generates an operation procedure (adjustment rule) for adjustment on an assumption that actual object data, i.e., inputs xi and outputs yi (i is an integer) are obtained, and these actual data are used to prepare a table (dependency relationship table) representing the qualitative characteristics obtained by classifying inputs (manipulated variables) in units of change patterns of outputs (controlled variables) having influences, as shown in FIG. 1.

In the adjustment control apparatus of the present invention, it is determined whether the current object situation exhibits an exceptional behavior (vibration/saturation), on the basis of an instruction (selection of an adjusted controlled variable and a manipulated variable) obtained from an automatically generated adjustment rule and a past operation in response to an occasionally output deviation. If it is determined that no exceptional behavior is observed, the instruction of the generated adjustment rule is executed; otherwise, the correction amount of the manipulated variable which is input to the object to be adjusted is given assuming that a predetermined input operation is performed.

An adjustment rule generating apparatus according to the first embodiment of the present invention, which determines the manipulated variable of the adjustment object or sets the value of a variable parameter (the variable parameter will not particularly be discriminated from the manipulated variable hereinafter) of an adjustment object such that a controlled variable within an allowable range can be obtained, is characterized by comprising adjustable controlled variable selection means for receiving a change in controlled variable corresponding to each manipulated variable of the adjustment object and qualitative feature data of a change difference between controlled variables and defining some manipulated variables which can be independently adjusted from the feature data in units of controlled variables, and adjustment rule format generating means for converting adjustable controlled variable data output from the adjustable controlled variable selection means in units of manipulated variables into a predetermined format and outputting the format as an adjustment procedure.

In the second embodiment, the adjustment rule generating apparatus is characterized in that feature data representing the change in controlled variable caused by each manipulated variable of the adjustment object is expressed as first binary data describing whether each manipulated variable affects each controlled variable, and the qualitative feature data in the change in controlled variable between controlled variables is expressed as second binary data describing change pattern given from each manipulated variable to each controlled variable, and these first and second binary data is used as the input data(manipulated variable characteristics and input/output dependency relationship table; to be referred to as a dependency table hereinafter).

The third embodiment relates to an adjustment control apparatus for performing a proportional operation. This apparatus is characterized by comprising deviation data generating means for calculating a deviation of a controlled variable of an adjustment object and outputting the deviation, adjustment rule storage means for receiving the controlled variable deviation obtained from the deviation data generating means and storing an adjustment rule obtained in the first or second embodiment, application rule selection means for receiving the controlled variable deviation calculated by the deviation data generating means and the adjustment rule stored in the adjustment rule storage means, selecting a manipulated variable to be adjusted, and defining the selected manipulated variable as an application rule, and manipulated variable determination means for determining a correction amount of the manipulated variable selected by the application rule selection means with reference to the controlled variable deviation as a predetermined proportional amount of the deviation of the controlled variable corresponding to the manipulated variable defined by the application rule.

The fourth embodiment relates to an adjustment control apparatus for performing a proportional operation and nonlinear avoidance. In the fourth embodiment, the adjustment control apparatus of the third embodiment is characterized by further comprising adjustment history data storage means for recording/updating adjustment history data (adjustment count, manipulated variable, controlled variable deviation, and the like), and in that the manipulated variable determination means refers to the controlled variable deviation and the adjustment history data stored in the adjustment history data storage means in accordance with the application rule selected by the application rule selection means to determine the correction amount of the manipulated variable of the application rule or a manipulated variable other than the manipulated variable as a proportional amount of the controlled variable deviation or a relative difference from another controlled variable deviation, or independently of the proportional amount, newly stores the determined manipulated variable or controlled variable deviation data referred to in determining the manipulated variable in the adjustment history data storage means, and updates the adjustment history data.

The fifth embodiment relates to an adjustment control apparatus for performing a test operation and nonlinear avoidance. In the fifth embodiment, the adjustment control apparatus of the fourth embodiment is characterized in that the application rule determination means also discriminates between test adjustment and actual adjustment for identifying characteristics of the object with reference to the adjustment history data stored in the adjustment history data storage means, and the manipulated variable determination means refers to data obtained from the adjustment history data storage means and the current controlled variable deviation of the adjustment object to determine a manipulated variable for test adjustment or actual adjustment, newly stores the determined manipulated variable or controlled variable deviation data referred to in determining the manipulated variable in the adjustment history data storage means, and updates the adjustment history data.

The sixth embodiment relates to an adjustment possibility evaluation apparatus. In the sixth embodiment, an adjustment possibility evaluation apparatus is characterized by comprising an input unit capable of receiving feature data of qualitative input/output relationship of the adjustment object or a dependency table and the adjustment rule obtained from the adjustment rule generating apparatus of the first or second embodiment, rule candidate initial setting means for generating some adjustment rules in which manipulated variables and controlled variables are in one-to-one correspondence, controlled variable selection means for selecting a controlled variable to check whether adjustment is enabled for each candidate rule set by the rule candidate initial setting means, corresponding manipulated variable search means for searching for a manipulated variable which corresponds to the controlled variable selected by the controlled variable selection means and can adjust the controlled variable, rule candidate generating means for storing the candidate rule as a rule candidate when all the controlled variables can be adjusted on the basis of the candidate rule set by the rule candidate initial setting means, and rule group generating means for outputting a rule group while omitting the same rule candidate stored in the rule candidate generating means.

The seventh embodiment relates to an adjustment rule candidate generating apparatus for preparing a dependency table and an adjustment rule. In the seventh embodiment, an adjustment rule candidate generating apparatus is characterized by comprising dependency table candidate generating means for generating some dependency table candidates defined in the third embodiment from actual input/output data of the adjustment object, adjustment rule generating apparatus of the third embodiment, which receives each dependency table candidate to acquire an adjustment rule corresponding to the dependency table candidate, and dependency table/rule candidate storage means for storing the adjustment rule obtained from the adjustment rule generating apparatus in correspondence with the dependency table candidate.

Figure 10:
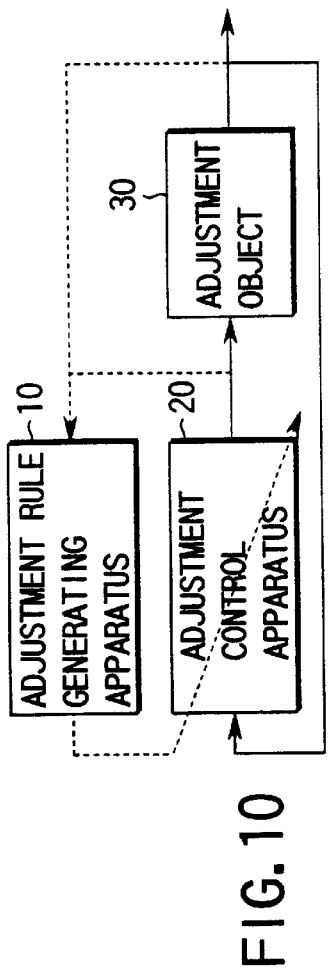
FIG. 10 is a block diagram showing the schematic arrangement of an adjustment control apparatus of the present invention.

A system shown in FIG. 10 comprises an adjustment rule generating apparatus 10, an adjustment control apparatus 20, and an adjustment object 30. The block diagram of FIG. 10 shows a system arrangement-in which the adjustment control apparatus 20 outputs an instruction for adjusting the variable parameter of the adjustment object 30 on the basis of an adjustment rule generated by the adjustment rule generating apparatus 10 such that a desired output is obtained from the adjustment object 30.

The block diagram shown in FIG. 10 is associated with the first to fifth embodiments. The adjustment rule generating apparatus 10 or the adjustment control apparatus 20 will be described below in units of embodiments.

(First Embodiment)

Figure 2:
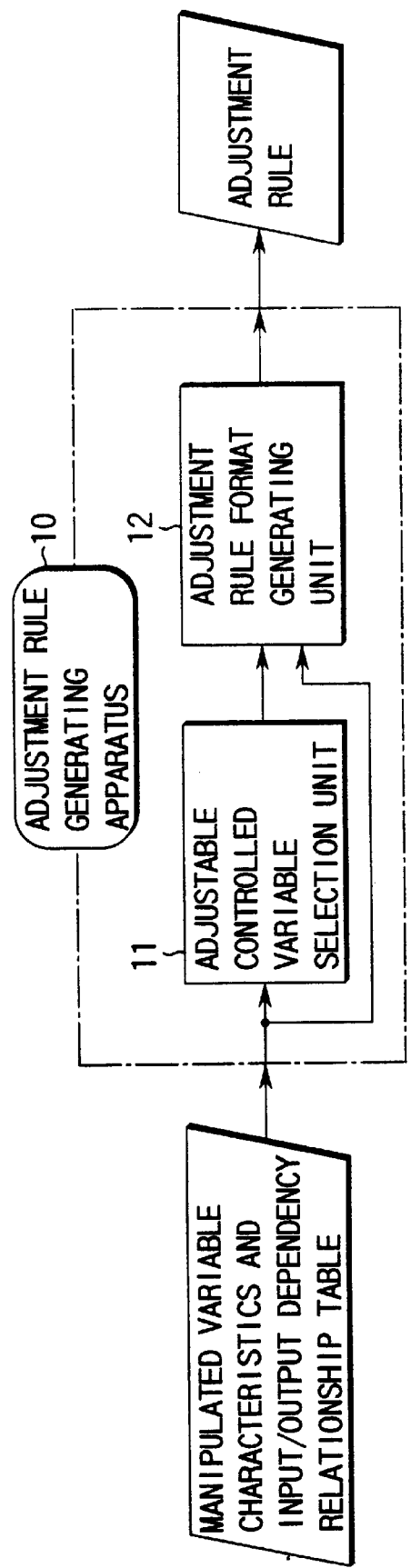
FIG. 2 is a block diagram showing the schematic arrangement of an adjustment rule generating apparatus (first and second embodiments) according to the first and second embodiments of the present invention.
Figure 3:
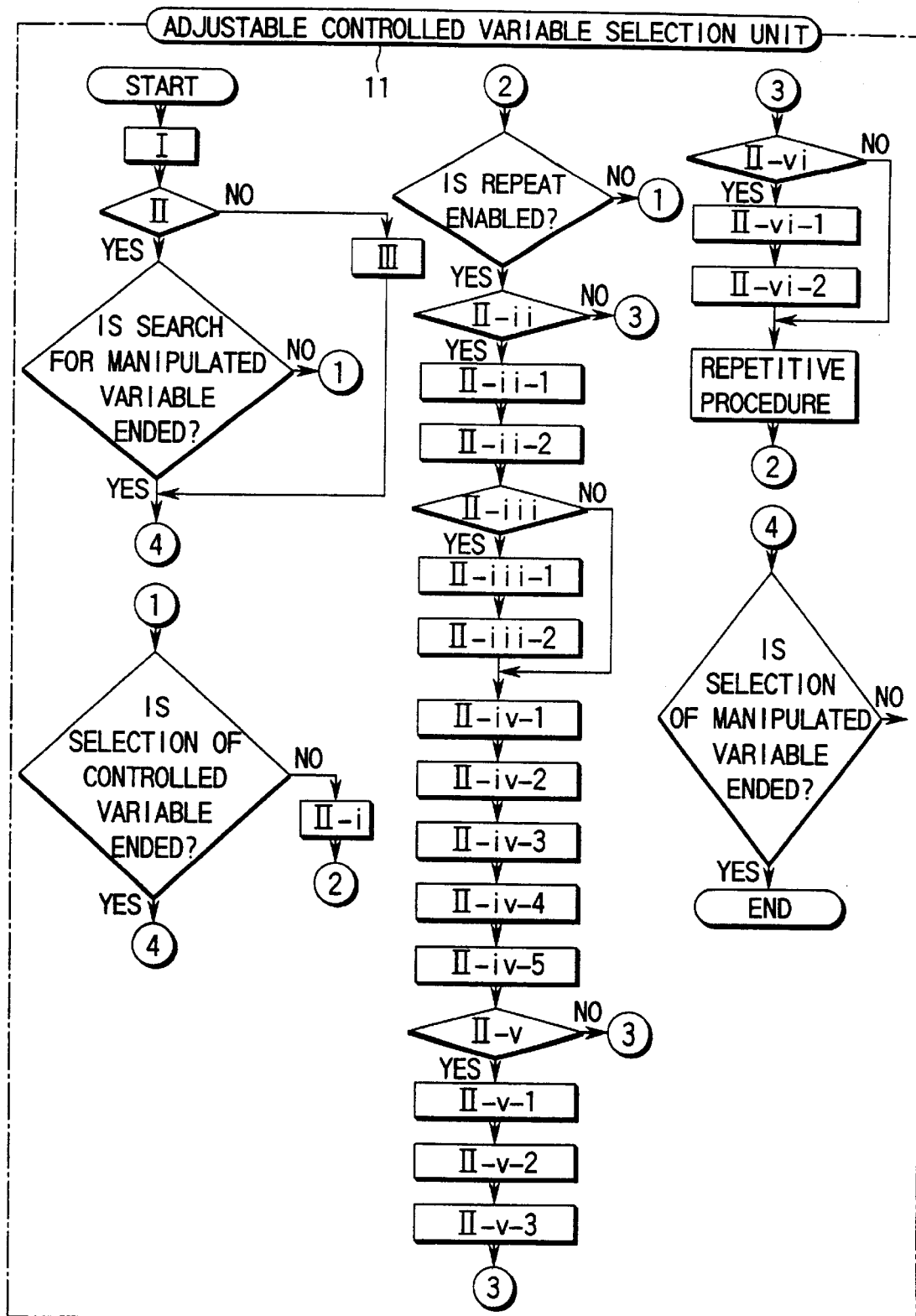
FIG. 3 is a flow chart showing the flow of processing in an adjustable controlled variable selection unit according to the second embodiment of the present invention.
Figure 4:
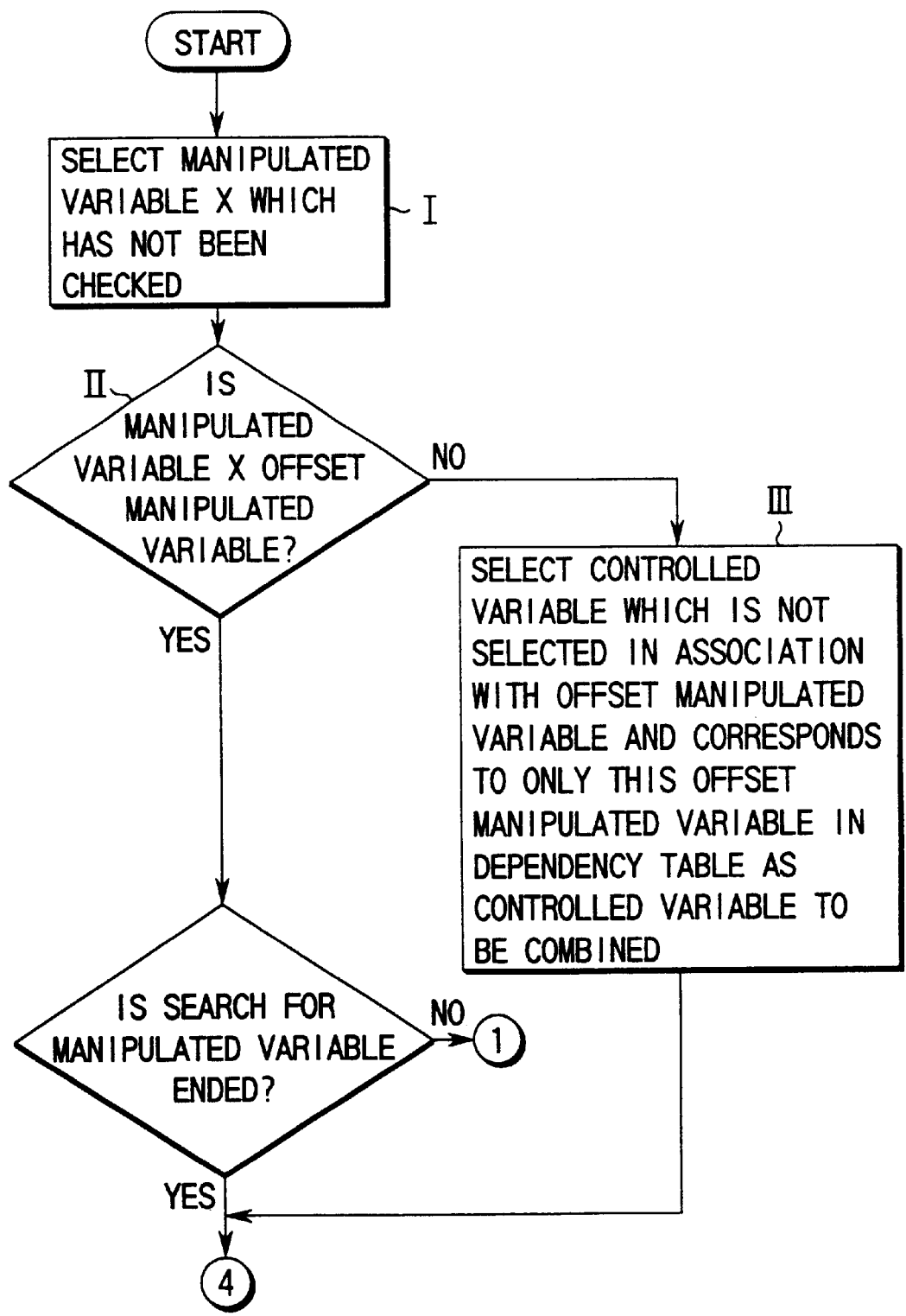
FIG. 4 is the first partial enlarged view of the flow chart in FIG. 3.
Figure 5:
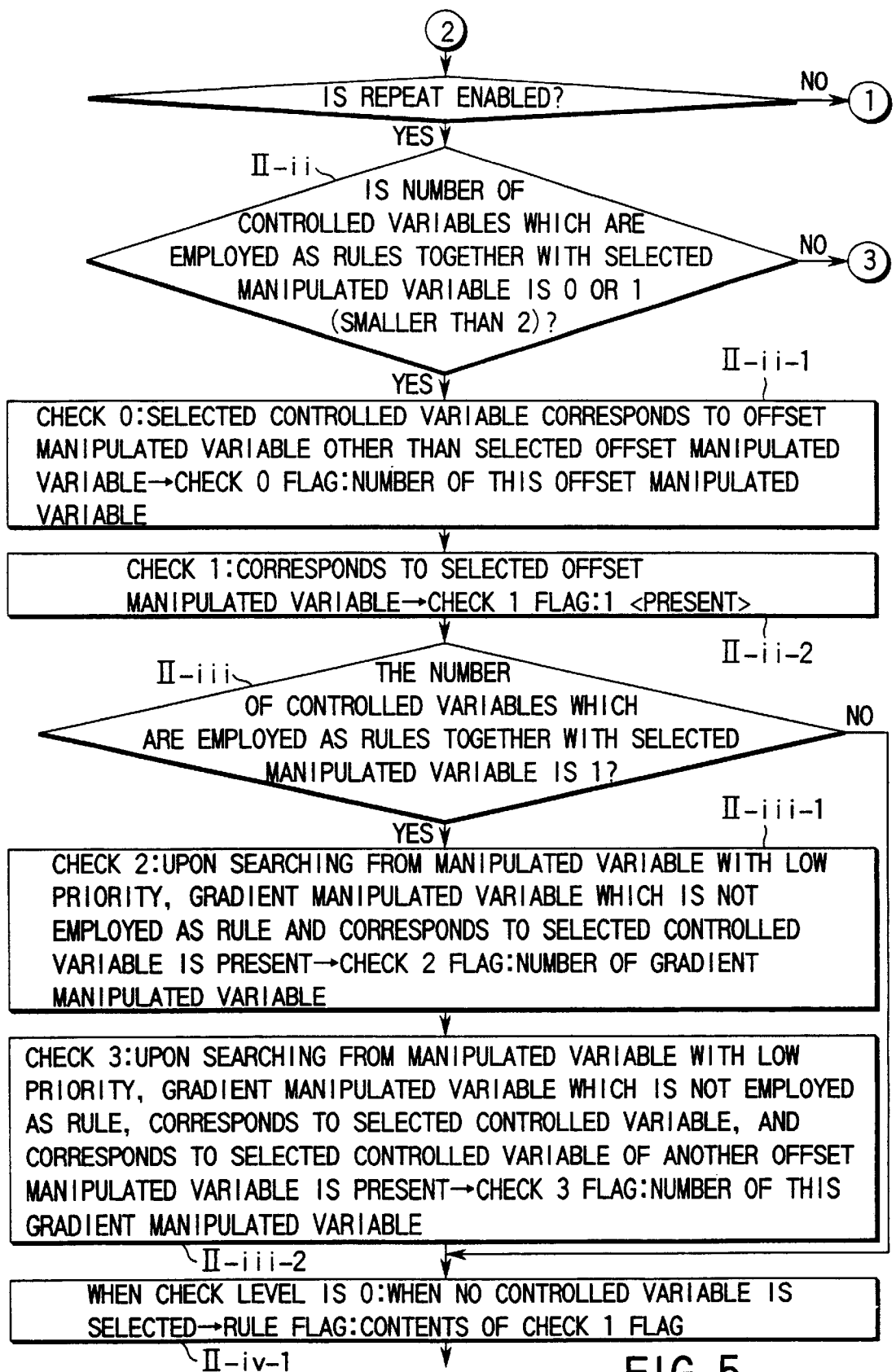
FIG. 5 is the second partial enlarged view of the flow chart in FIG. 3.
Figure 6:
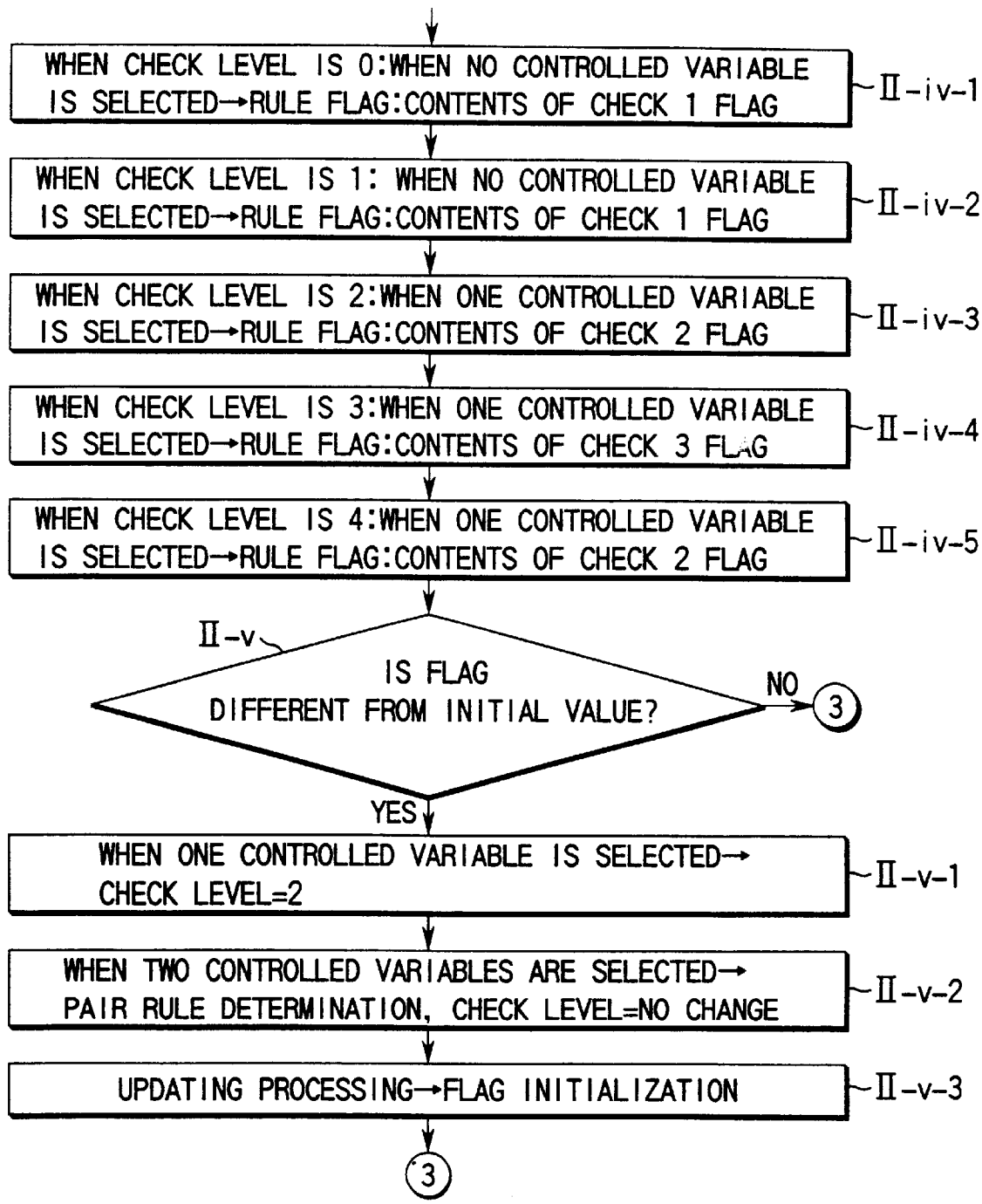
FIG. 6 is the third partial enlarged view of the flow chart in FIG. 3.
Figure 7:
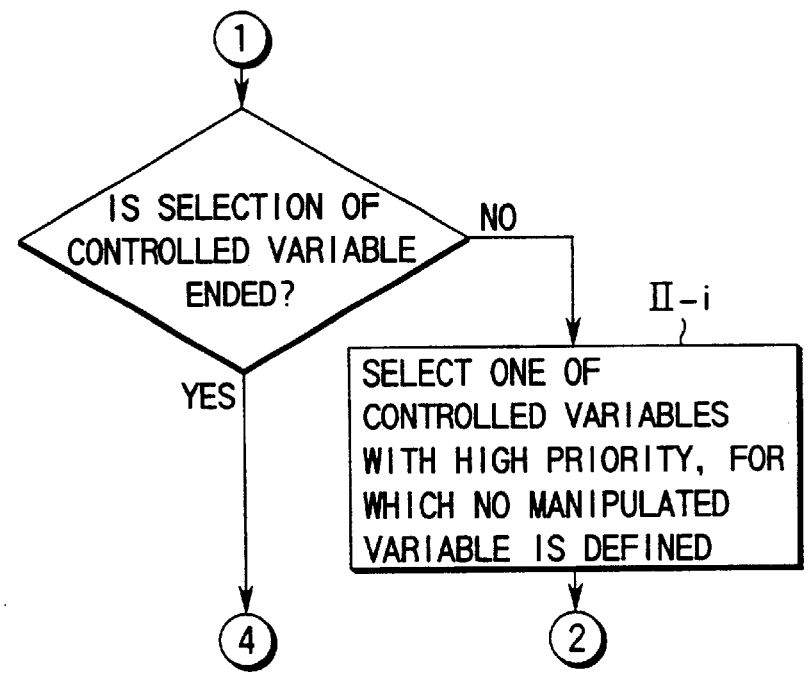
FIG. 7 is the fourth partial enlarged view of the flow chart in FIG. 3.
Figure 8:
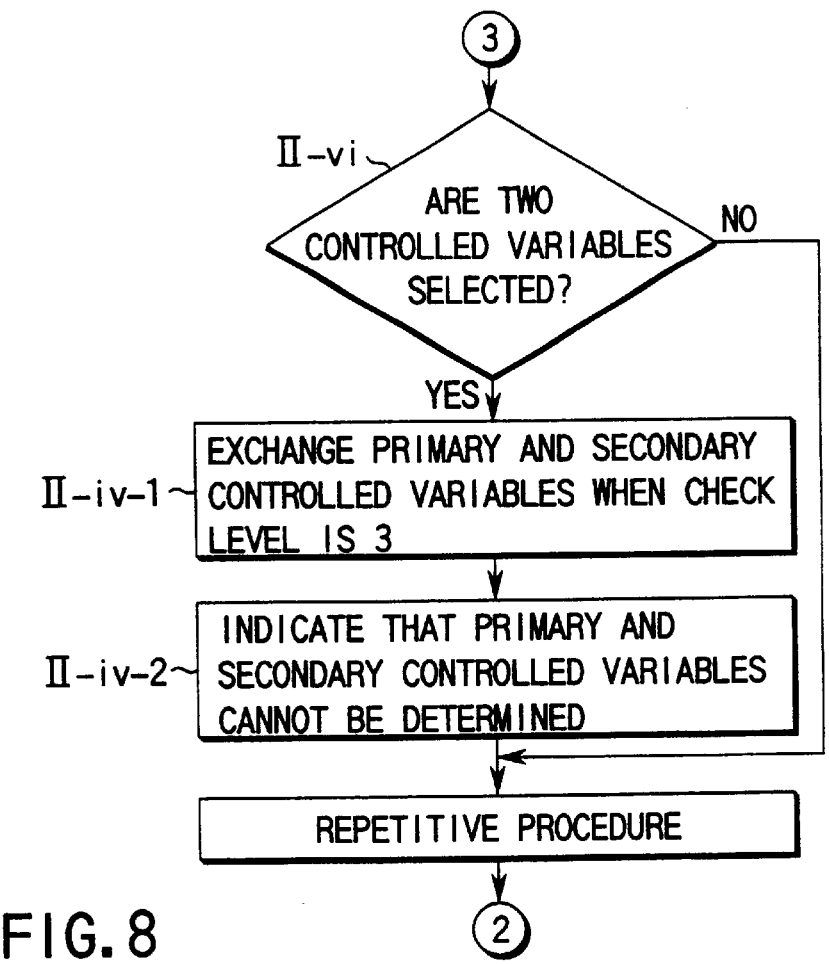
FIG. 8 is the fifth partial enlarged view of the flow chart in FIG. 3.

FIG. 2 is a block diagram showing the schematic arrangement of an adjustment rule generating apparatus 10 according to the first embodiment and the second embodiment (to be described later). As shown in FIG. 2, the adjustment rule generating apparatus 10 comprises an adjustable controlled variable selection unit 11 and an adjustment rule format generating unit 12.

The adjustable controlled variable selection unit 11 selects an adjustable parameter (controlled variable= output from the adjustment object) to be adjusted and an adjustment element (manipulated variable= input to the adjustment object) used to adjust the parameter in an adjustment object 30.

The adjustment rule format generating unit 12 outputs an adjustment rule having a predetermined format on the basis of the combination of the manipulated variable and controlled variable selected by the adjustable controlled variable selection unit 11.

Tables 1 and 2 show examples of input data to the adjustable controlled variable selection unit 11 according to the first embodiment. In this case, an adjustment object having three-dimensional inputs/outputs is exemplified. Table 1 shows dependency characteristic data, and Table 2 shows controlled variable correlation characteristic data.

TABLE 1

DEPENDENCY CHARACTERISTIC DATA (QUALITATIVE INPUT/OUTPUT DEPENDENCY CHARACTERISTICS OF ADJUSTMENT OBJECT)

| CONTROLLED VARIABLE (OUTPUT) | Manipulated VARIABLE (INPUT) | | |
|---|---|---|---|
| | X1 | X2 | X3 |
| Y1 | x | ○ | x |
| Y2 | ○ | x | ○ |
| Y3 | ○ | x | ○ |

NOTE) ○X REPRESENTS PRESENCE/ABSENCE OF DEPENDENCY OF INPUT/OUTPUT
○: DEPENDENCY IS PRESENT
X: DEPENDENCY IS NOT PRESENT

TABLE 2

CONTROLLED VARIABLE CORRELATION CHARACTERISTIC DATA (QUALITATIVE CHARACTERISTICS OF CHANGE DIFFERENCE BETWEEN CONTROLLED VARIABLES OF ADJUSTMENT OBJECT)

| BETWEEN CONTROLLED VARIABLES | MANIPULATED VARIABLE | | |
|---|---|---|---|
| | X1 | X2 | X3 |
| Y1 ⇆ Y2 | C | C | C |
| Y2 ⇆ Y3 | A | C | B |
| Y3 ⇆ Y1 | C | C | C |

NOTE) A TO C REPRESENT CHANGES IN CHARACTERISTICS
A: CHANGE IN SAME DIRECTION
B: CHANGE IN DIFFERENT DIRECTIONS
C: ONLY ONE VARIABLE CHANGES

The dependency characteristic data (Table 1) is the qualitative input/output dependency characteristics of the adjustment object and indicates whether the manipulated variable and the controlled variable (input and output) of the adjustment object have a dependency relationship. A specific manipulated variable and a controlled variable adjusted by the specific manipulated variable can be determined from the table of the dependency characteristic data. In Table 1, the following relationship is estimated.

Controlled variable Y1 is adjusted by manipulated variable X2

(1) Controlled variable Y2 or Y3 is adjusted by manipulated variable X1 or X3

The controlled variable correlation characteristic data qualitatively represents the change in controlled variable in response to each manipulated variable (relative change in characteristics between a controlled variable and another controlled variable). In Table 2, the characteristics between two arbitrary controlled variables are classified into three types (the number and characteristics in classification can be arbitrarily defined).

A: "The two controlled variables change in the same direction"

B: "The two controlled variables change in different directions"

C: "Only one controlled variable changes" The relationship between the controlled variable of interest and the manipulated variable is limited under condition (1). When the relationships shown in Table 2 are referred to for only that portion, adjustment characteristics below are estimated.

Manipulated variable X1< Change A in controlled variables Y2 and Y3

Manipulated variable X2→ Change C in controlled variable Y1 (independent)

(2) Manipulated variable X3→ Change B in controlled variables Y2 and Y3

The adjustable controlled variable selection unit 11 outputs data which represents the relationship between the controlled variable of the adjustment object and the manipulated variable for adjusting the controlled variable as adjustment characteristic data.

Table 3 shows an example of adjustment characteristic data.

TABLE 3

ADJUSTMENT CHARACTERISTIC DATA

| X1 | Y2, Y3 | A |
| X2 | Y1 | C |
| X3 | Y2, Y3 | B |

More specifically, the adjustable controlled variable selection unit 11 outputs the relationship "manipulated variable X1→ change A in controlled variables Y2 and Y3" as adjustment characteristic data "X1 Y2, Y3 A", the relationship "manipulated variable X2→ change C in controlled variable Y1 (independent)" as adjustment characteristic data "X2 Y1 C", and the relationship "manipulated variable X3→ change B in controlled variables Y2 and Y3" as adjustment characteristic data "X3 Y2, Y3 B".

The adjustment rule format generating unit 12 converts the adjustment characteristic data output from the adjustable controlled variable selection unit 11 into a specific format of adjustment rules with reference to the characteristic data of the adjustment object shown in Tables 1 and 2. The adjustment characteristic data having contents shown in Table 3 is interpreted in units of rows, and the relationship between the controlled variable to be adjusted and the manipulated variable is defined as an adjustment rule corresponding to the condition in accordance with the controlled variable correlation characteristics (A, B, and C) defined in Table 2.

More specifically, as indicated by the adjustment characteristic data in Table 3, for the first row, it is determined that "since "Y2 and Y3 are changed by X1 in the same direction (A)", if Y2 and Y3 have almost the same deviation and are out of the allowable deviation, Y2 and Y3 can be adjusted using X1 for changing the two deviations in the same direction". For the second row, it is determined that "since "Y1 changes depending only on X2 (C)", when Y1 is out of the allowable deviation, Y1 can be adjusted using X2". For the third row, it is determined "since "Y2 and Y3 are changed by X3 in different directions (B)", if Y2 and Y3 have different deviations and are out of the allowable deviation, Y2 and Y3 can be adjusted using X3 for changing the two deviations in different directions".

These are output as adjustment rules in the following format:

($\varepsilon_1$, $\varepsilon_2$, and $\varepsilon_3$ are allowable deviations) (3)

$$\begin{cases} (|Y_2| > \varepsilon_2 \vee |Y_3| > \varepsilon_3) \wedge (Y_2 \simeq Y_3) \Longrightarrow TuneX_1 \\ |Y_1| > \varepsilon_1 \Longrightarrow TuneX_2 \\ (|Y_2| > \varepsilon_2 \vee |Y_3| > \varepsilon_3) \wedge (Y_2 \not\simeq Y_3) \Longrightarrow TuneX_3 \end{cases}$$

Although Table 1 is not referred to in the above description, priority may be given to each rule using Table 1 in accordance with the number of dependency relationships (number of 0s).

The rule of the above format (3) does not give the specific correction amount of each manipulated variable. However, the correction amount can be set using a conventionally well-known scheme as follows.
1. A correction amount is occasionally set by human determination.
2. A predetermined correction amount is set in accordance with the sign of deviation.
3. A correction amount proportional to the sign/magnitude of deviation is set.

(Second Embodiment)

The second embodiment is characterized in that the adjustment feature data in the first embodiment is classified into two types, and the arrangements and input/output data of an adjustable controlled variable selection unit 11 and an adjustment rule format generating unit 12 are made to correspond to this classification.

Table 4 shows data to be input to the adjustable controlled variable selection unit 11.

TABLE 4

INPUT DATA "DEPENDENCY TABLE"

| 3 | | |
|---|---|---|
| 1 | 0 | 1 |
| 0 | 1 | 1 |
| 0 | 1 | 1 |
| 1 | 1 | 1 |

Table 4 is in case of an adjustment object with three inputs and three outputs. In Table 4, the controlled variable correlation characteristic data and the adjustment feature data in the first embodiment are put together, and the respective data are represented as binary data ("3" in Table 4 is additional data representing the number of dimensions but not directly indicating the characteristic feature of the dependency relationship between an input and an output). Such a table will be particularly referred to as a "dependency table" hereinafter.

The "dependency table" describes the following three data as shown in Table 5.

TABLE 5

DESCRIPTION OF "DEPENDENCY TABLE"

| DEPENDENCY TABLE | | | DESCRIPTION |
|---|---|---|---|
| 3 | | | NUMBER OF MANIPULATED VARIABLES |
| 1 | 0 | 1 | CHANGE PATTERN OF CONTROLLED VARIABLES DUE TO EACH MANIPULATED VARIABLE (ADJUSTMENT CHARACTERISTIC DATA: CHANGE IN THE SAME DIRECTION "0" OR CHANGE IN DIFFERENT DIRECTIONS "1") |
| 0 | 1 | 1 | WHETHER EACH MANIPULATED VARIABLE AFFECTS THE FIRST CONTROLLED VARIABLE (1) OR NOT (0) (CONTROLLED VARIABLE CORRECTION CHARACTERISTIC DATA) |
| 0 | 1 | 1 | WHETHER EACH MANIPULATED VARIABLE AFFECTS THE SECOND CONTROLLED VARIABLE (1) OR NOT (0) (CONTROLLED VARIABLE CORRELATION CHARACTERISTIC DATA) |
| 1 | 1 | 1 | WHETHER EACH MANIPULATED VARIABLE AFFECTS THE THIRD CONTROLLED VARIABLE (1) OR NOT (0) (CONTROLLED VARIABLE CORRELATION CHARACTERISTIC DATA) |

Upon receiving the data in the dependency table shown in Table 4, the adjustable controlled variable selection unit 11 determines combinations of manipulated variables and controlled variables by processing following checklists 1 and 2 and a procedure shown in FIG. 2 on the basis of the dependency table. With this procedure, the adjustable controlled variable selection unit 11 outputs the priority of each manipulated variable and a controlled variable which must be unconditionally adjusted by the manipulated variable as "rule data".

Manipulated variables will be classified in accordance with the change pattern of corresponding controlled variables: "a manipulated variable for changing controlled variables in the same direction (i.e., change pattern "10")" will be called "an offset manipulated variable"; and "a manipulated variable for changing controlled variables in different directions (i.e., change pattern "1")" will be called "a gradient manipulated variable" hereinafter. In addition, the dependency relationship between a manipulated variable and a controlled variable will be simply expressed as "correspondence".

[Checklist 1]

I. For a square matrix in the dependency table where whether each manipulated variable affects a controlled variable is described, row sums and column sums are calculated.

II. Priority is given to manipulated variables in descending order of the column sum values (if the values equal, priority is given to offset manipulated variables. If the values still equal, priority is set in accordance with the manipulated variable number).

III. Priority is given to controlled variables in ascending order of the row sum values (control variables with the same value are allowed to have the same priority).

[Checklist 2] (FIGS. 3 to 8)

Step I. A manipulated variable with low priority is selected ("selected manipulated variable").

Step II. The manipulated variable is an offset manipulated variable ("selected offset manipulated variable").

(II-i) One of controlled variables with high priority, for which no manipulated variable is defined, is selected ("selected controlled variable").

(II-ii) The number of controlled variables employed as rules together with the selected manipulated variable is "0" or "1" (smaller than "2").

Step II-ii-1. Check 0: an offset manipulated variable other than the selected offset manipulated variable corresponds to the selected controlled variable.

→ Check 0 flag: number (which is selected first) of the offset manipulated variable (other than the selected offset manipulated variable)

Step II-ii-2. Check 1: the controlled variable corresponds to the selected offset manipulated variable.

→ Check 1 flag: 1 <present>

(II-iii) The number of controlled variables employed as rules together with the selected manipulated variable is "1".

Step II-iii-1. Check 2: upon searching for manipulated variables with low priority in ascending order, a gradient manipulated variable which corresponds to the selected controlled variable and is not employed as a rule is present.

→ Check 2 flag: the number of the gradient manipulated variable (which is selected first).

Step II-iii-2. Check 3: upon searching for manipulated variables with low priority in ascending order, a gradient manipulated variable which is not employed as a rule and corresponds to the selected controlled variable for another offset manipulated variable is present.

→ Check 3 flag: number of the gradient manipulated variable (which is selected first).

(II-iv) The dependency relationship pattern is searched for (initial value: check level 0).

Step II-iv-1. When check level is "0": when no controlled variable is selected.

→ Rule flag: contents of check 1 flag

Step II-iv-2. When check level is "1": when no controlled variable is selected.

→ Rule flag: contents of check 1 flag

Step II-iv-3. When check level is "2": when one controlled variable is selected.

→ Rule flag: contents of check 2 flag

Step II-iv-4. When check level is "3": one controlled variable is selected.

→ Rule flag: contents of check 3 flag

Step II-iv-5. When check level is "14": when one controlled variable is selected.

→ Rule flag: contents of check 2 flag (II-v) Determination of combination (when the flag is different from the initial value)

Step II-v-1. When one controlled variable is selected
→ Check level= 2

Step II-v-2. When two controlled variables are selected
→ Rule determination, check level= no change Step II-v-3. Updating processing
→ Flag initialization (II-vi) Special processing performed when two controlled variables are selected (a controlled variable corresponding to the offset manipulated variable is "primary", and a controlled variable corresponding to the gradient manipulated variable is "secondary").

Step II-vi-1. When check level is "3", the primary and secondary controlled variable are exchanged.

Step II-vi-2. Indication that the primary and secondary controlled variables cannot be determined.

Step III. A gradient manipulated variable which corresponds to only one controlled variable and is not selected in determining the combinations of offset manipulated variables is selected.

Checklist 2 has the above-described arrangement.

The flow of processing in the adjustable controlled variable selection unit 11 for Table 4 will be described below.

1. The row sums and column sums for the adjustment feature data portion of the dependency table are calculated in accordance with the [Checklist 1].

Following Table 6 describes a result of the row sums and column sums in example of the Table 4.

TABLE 6

THREE-DIMENSIONAL EXAMPLE IN TABLE 4

|  | MANIPULATED VARIABLE | | | ROW SUM |
|---|---|---|---|---|
|  | X 1 | X 2 | X 3 |  |
| CONTROLLED VARIABLE Y 1 | 0 | 1 | 1 | 2 |
| CONTROLLED VARIABLE Y 2 | 0 | 1 | 1 | 2 |
| CONTROLLED VARIABLE Y 3 | 1 | 1 | 1 | 3 |
| COLUMN SUM | 1 | 3 | 3 |  |

2. The order of manipulated variables is defined in accordance with II of [Checklist 1].

Following Table 7 describes the order of manipulated variables in example of Table 4.

TABLE 7

ORDER OF MANIPULATED VARIABLE IN EXAMPLE OF TABLE 4

| MANIPULATED VARIABLE | X 1 | X 2 | X 3 |
|---|---|---|---|
| ORDER | 3 | 1 | 2 |

3. The order of controlled variables is defined in accordance with III of [Checklist 1].

Following Table 8 describes the order of controlled variables in example of Table 4.

TABLE 8

ORDER OF CONTROLLED VARIABLES IN EXAMPLE OF TABLE 4

| CONTROLLED VARIABLE | Y 1 | Y 2 | Y 3 |
|---|---|---|---|
| ORDER | 1 | 1 | 2 |

4. If there are certain manipulated variables of which change characteristics are correctable, the combination of them is determined in accordance with [Checklist 2] (refer to FIGS. 3 to 8).

(4-1) The manipulated variable XI with low priority, which has not been checked, is selected in step I.

(4-2) It is determined in step II that the manipulated variable X1 is not an offset manipulated variable→ to step III.

(4-3) In step III, the controlled variable Y3 which has not been selected in association with the offset manipulated variable and corresponds to only the manipulated variable X1 in the dependency table is selected as a controlled variable to be combined (rule data (X1, Y3)). Check of all manipulated variables is not complete→ to step I.

(4—4) In step I, the manipulated variable X3 with low priority, which has not been checked yet, is selected.

(4-5) It is determined in step II that the manipulated variable X3 is not an offset manipulated variable→ to 3.

(4-6) In step III, a controlled variable which has not been selected in association with the offset manipulated variable and corresponds to only the manipulated variable X3 in the dependency table is not present (no rule data associated with X3). Check of all manipulated variables is not complete→ to step I.

(4-7) In step I, the manipulated variable X2 which has not been checked yet is selected.

(4-8) It is determined in step II that the manipulated variable X2 is an offset manipulated variable (check level= 0, rule flag= 0, check flag)→ to step II-i.

(4-9) In step II-i, a controlled variable Y with high priority, which has not been selected yet, is selected→ to step II-ii.

(4-10) In step II-ii, the number of controlled variables which have already been selected as rule data in correspondence with the selected manipulated variable X2 is "0" → to step II-ii-1.

(4-11) In step II-ii-1, no manipulated variables other than the selected manipulated variable X2 correspond to the selected controlled variable Y1 (check 0 flag= 0)→ to step II-ii-2.

(4-12) In step II-ii-2, the manipulated variable X2 corresponds to the controlled variable Y1 (check 1 flag= 1)→ to step II-iii.

(4-13) In step II-iii, the number of controlled variables which have already been selected as rule data in correspondence with the selected manipulated variable X2 is "0". The current check level is "0"→ to step II-iv-1.

(4-14) In step II-iv-1, rule flag= check 1 flag (rule data updating (X1, Y3 ), (X2, Y1))→ to step II-v.

(4-15) In step II-v, the rule flag is different from the initial value→ step II-v-1.

(4-16) In step II-v-1, since the number of controlled variables which have been selected as rule data in correspondence with the selected manipulated variable X2 is "1", check level is "2". Updating processing in step II-v-3→ to step II-i.

(4-17) In step II-i, the controlled variable Y2 with high priority, which has not been selected yet, is selected→ to step II-ii.

(4-18) In step II-ii, the number of controlled variables which have already been selected as rule data in correspondence with the selected manipulated variable X2 is "1" → to step II-ii-1.

(4-19) In step II-ii-1, no offset manipulated variables other than the selected manipulated variable X2 correspond to the selected controlled variable Y2 (check 0 flag= 0)→ to step II-ii-2.

(4-20) In step II-ii-2, the manipulated variable X2 corresponds to the controlled variable Y2 (check 1 flag= 1)→ to step II-iii.

(4-21) In step II-iii, the number of controlled variables which have already been selected as rule data in correspondence with the selected manipulated variable X2 is "1" → to step II-iii-1.

(4-22) In step II-iii-1, a gradient manipulated variable corresponding to the selected controlled variable Y2, which has not been employed as rule data, is present (X3, check 2 flag= 3)→ to step II-iii-2.

(4-23) In step II-iii-2, there are no gradient manipulated variables corresponding to the selected controlled variable Y2 and corresponding to the selected controlled variable for another offset manipulated variable, which have not been employed as rule data. The current check level is "2" → to step II-iv-3.

(4-24) In step II-iv-3, rule flag= check 2 flag → to step II-v.

(for the manipulated variable X2, rule data updating (X1, Y3 ), (X2, Y1, Y2, X3, Y2)).

(4-25) In step II-v, the rule flag is different from the initial value, and two controlled variables have been selected. Updating processing in step II-v-3. Check level is "2" → to step II-vi-2.

(4-26) In step II-vi-2, both the controlled variables Y1 and Y2 correspond to the manipulated variables X2 and X3. Correspondence between the manipulated variable and controlled variables to be adjusted by the manipulated variables cannot be determined. A flag (2) representing this is added (rule data updating (X1, Y3 ), (X2, Y1, Y2, X3, Y1, Y2, 2)).

(4-27) Check of all manipulated variables is complete.

5. Output of rule data $$(X1, Y3\ ), (X2, Y1, Y2, X3, Y1, Y2, 2) \qquad . (4)$$

The adjustment rule format generating unit 12. arranges rule data (represented as in (4)) output from the adjustable controlled variable selection unit 11 in units of manipulated variables and changes the rule data into a format which can be readily used for adjustment. An adjustment rule format generation procedure will be described with reference to [Checklist 3] and FIG. 9. The format of the adjustment rule is shown in [Format 1].

Figure 9:
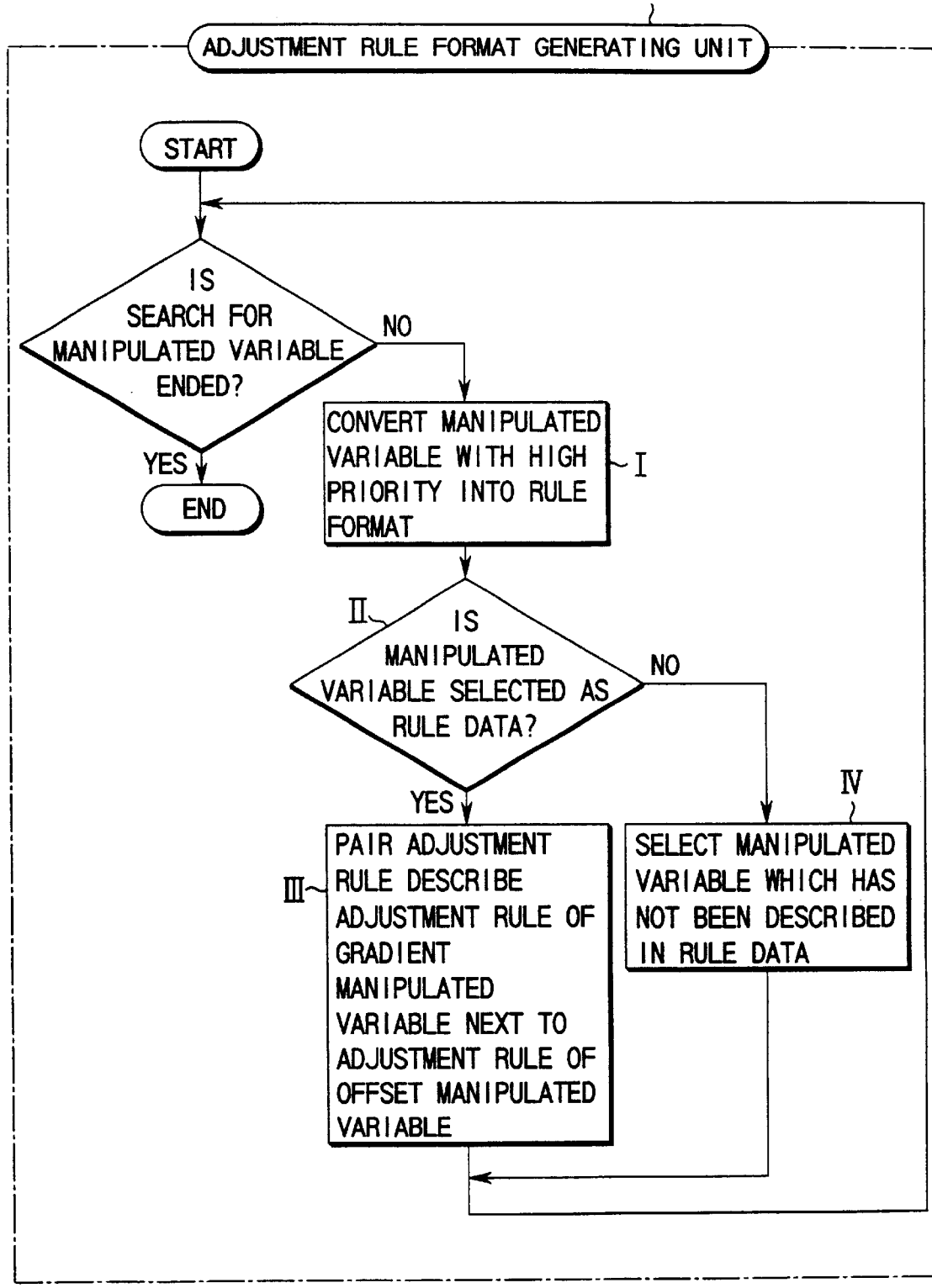
FIG. 9 is a flow chart showing the flow of processing of an adjustment rule format generating unit in the adjustment rule generating apparatus (second embodiment)

[Checklist 3] (FIG. 9)

I. Convert a manipulated variable with high priority into a rule format.

II. Has the manipulated variable been selected as rule data?

III. Pair adjustment rule (when the rule data has flag "2"). The adjustment rule of a gradient manipulated variable is described next to the adjustment rule of an offset manipulated variable.

IV. A manipulated variable which is not described in the rule data (all corresponding controlled variables which have not been selected yet are selected).

[Format 1]

I. Manipulated variable number

II. Offset manipulated variable or gradient manipulated variable

III. Pattern of controlled variables (III-i) Flag "2" is present at the end of the rule data "2" for offset manipulated variable, and.

"1" for gradient manipulated variable (III-ii) No flag "2" is present at the end of the rule data "0" or both offset manipulated variable and gradient manipulated variable IV. Controlled variable number of adjustment object V. Adjustment rule end identifier (−1)

As in the adjustable controlled variable selection unit 11, the flow of processing in the adjustment rule format generating unit 12 for Table 4 will be described below.

1. The manipulated variable X2 with high priority is selected from Table 7.

2. On the basis of the rule associated with the manipulated variable X2 in rule data (4), the adjustment rule ("20212-1") associated with the manipulated variable X2 is described in accordance with the "adjustment rule format".

3. For the gradient manipulated variable X3 described in the rule associated with the manipulated variable X2 in rule data (4) as well, the adjustment rule ("31112-1") associated with the manipulated variable X3 is additionally described in accordance with the "adjustment rule format".

4. The manipulated variable X1 with high priority, which has not been checked yet, is selected from Table 7.

5. On the basis of the rule associated with the manipulated variable X1 in rule data (4), the adjustment rule ("1103-1")

associated with the manipulated variable X1 is additionally described in accordance with the "adjustment rule format".

6. Since all manipulated variables in Table 7 have been checked, processing is ended.

In this manner, the adjustment rule format generating unit 12 outputs the adjustment rules in the format as shown in Table 9.

TABLE 9

EXAMPLE OF ADJUSTMENT RULES

| 2 | 0 | 2 | 1 | 2 | −1 |
|---|---|---|---|---|---|
| 3 | 1 | 1 | 1 | 2 | −1 |
| 1 | 1 | 0 | 3 | −1 | |

<Interpretation of Adjustment Rule>

Interpretation of the adjustment rule will be described next. Table 10 describes the format of adjustment rule.

TABLE 10

FORMAT OF ADJUSTMENT RULE

| NUMBER OF MANIPU- LATED VARIABLE TO BE CORRECTED | OFFSET (0) OR GRADIENT (1) | PATTERN OF CON- TROLLED VARIABLE TO BE ADJUSTED | NUMBER OF CON- TROLLED VARIABLE TO BE ADJUSTED | ... | ROW END IDEN- TI- FIER |
|---|---|---|---|---|---|

Each row means an instruction (to be referred to as a rule hereinafter) for one manipulated variable. The respective columns in each row have the following meanings. As shown in Table 10, the first element represents "number of manipulated variable to be corrected"; the second element, "offset or gradient"; the third element, "pattern of controlled variable to be adjusted"; and the fourth element, "numbers of controlled variables to be adjusted". "−1" at the end of each row means the end of the row (identifier indicating the end of the row). According to this rule, "correct" and "adjust" mean that the manipulated variable is corrected to adjust the controlled variable (to a desired value).

The first row of Table 9 is shown as Table 11, and this can be interpreted as follows.

TABLE 11

FORMAT OF ADJUSTMENT RULE

| 2 | 0 | 2 | 1 | 2 | −1 |
|---|---|---|---|---|---|

The number of the manipulated variable to be corrected is "2", the tendency of change is "offset", the pattern of the controlled variable to be adjusted is "2", and the numbers of controlled variables to be adjusted is "1" and "2".

In Table 9 as a whole, it is sequentially determined from the first row whether the adjustment rule indicated on each row is suitable for the situation (whether the deviation of the controlled variable to be referred to falls within the allowable range), and then, adjustment is performed. The first row of Table 9 can be interpreted as described in Table 12.

TABLE 12

FORMAT OF ADJUSTMENT RULE

| FIRST ITEM "2" → | "IN THIS RULE, SECOND MANIPU- LATED VARIABLE IS USED FOR ADJUSTMENT" |
|---|---|

TABLE 12-continued

FORMAT OF ADJUSTMENT RULE

| SECOND ITEM "0" → | "MANIPULATED VARIABLE OF THIS RULE IS OFFSET MANIPULATED VARIABLE" |
|---|---|
| THIRD ITEM "2" → | "THIS RULE IS USED WHEN TWO OR MORE CONTROLLED VARIABLES OF CONTROLLED VARIABLES INDICATED BY ITEMS FROM FOURTH ITEM AREA OUT OF ALLOWANCES" (CORRECTION AMOUNT IS SET ON THE BASIS OF SMALLEST ERROR) |
| FOURTH ITEM "1" → | "FIRST CONTROLLED VARIABLE (IF IT IS OUT OF ALLOWANCE) IS ADJUSTED AS FIRST PRIORITY" |
| FIFTH ITEM "2" → | "SECOND CONTROLLED VARIABLE (IF IT IS OUT OF ALLOWANCE) IS ADJUSTED AS SECOND PRIORITY" |
| SIXTH ITEM "−1" → | "CONTROLLED VARIABLE AS ADJUSTMENT OBJECT OF THIS RULE IS NOT PRESENT ANYMORE" |

As shown in Table 12, the first item, i.e., the first element is "2", and this means that "in this rule, the second manipulated variable is used for adjustment". The second item, i.e., the second element is "0", and this means that "the manipulated variable of this rule is an offset manipulated variable". The third item is "2", and this means that "this rule is used when two or more controlled variables indicated from the fourth item are out of the allowable ranges". The correction amount is set on the basis of the smallest error. The fourth item is "1", and this means that the first controlled variable (if it is out of the allowable range) is adjusted as the first priority. The fifth item is "2", and this means that "the second controlled variable (if it is out of the allowable range) is adjusted as the second priority". The sixth item is "−1", and this means that "controlled variables as adjustment objects of this rule are not present anymore".

Interpretation of the adjustment rule is based on three rules "rule 1)" to "rule 3)" shown in Table 13.

TABLE 13

INTERPRETATION OF ADJUSTMENT RULE

| RULE 1) | WHEN BOTH FIRST AND SECOND CONTROLLED VARIABLES ARE OUT OF ALLOWANCES, ADJUSTMENT IS PERFORMED USING SECOND MANIPULATED VARIABLE ON THE BASIS OF SMALLER ERROR |
|---|---|
| RULE 2) | WHEN ONE OF FIRST AND SECOND CONTROLLED VARIABLES IS OUT OF ALLOWANCE, ADJUSTMENT IS PERFORMED USING THIRD MANIPULATED VARIABLE |
| RULE 3) | WHEN THIRD CONTROLLED VARIABLE IS OUT OF ALLOWANCE, ADJUSTMENT IS PERFORMED USING FIRST MANIPULATED VARIABLE |

"Rule 1)" defines that "when both the first and second controlled variables are out of the allowable ranges, adjustment is performed using the second manipulated variable on the basis of the smaller error". "Rule 2)" defines that "when one of the first and second controlled variables is out of the allowable range, adjustment is performed using the third manipulated variable". "Rule 3)" defines that "when the third controlled variable is out of the allowable range, adjustment is performed using the first manipulated variable".

<First Arrangement of Adjustment Control Apparatus 20>

FIG. 10 is a block diagram showing the basic arrangement of an adjustment control apparatus 20 according to the third or fourth embodiment. In order to obtain a desired output from the adjustment object 30, the adjustment control apparatus 20 inputs a correction amount to an adjustment object 30 to change a variable parameter in the adjustment object 30 on the basis of the deviation between the output from the adjustment object 30 and the desired value in accordance with an adjustment rule obtained from the adjustment rule generating apparatus 10 according to the first or second embodiment.

<Second Arrangement of Adjustment Control Apparatus 20>

Figure 11:
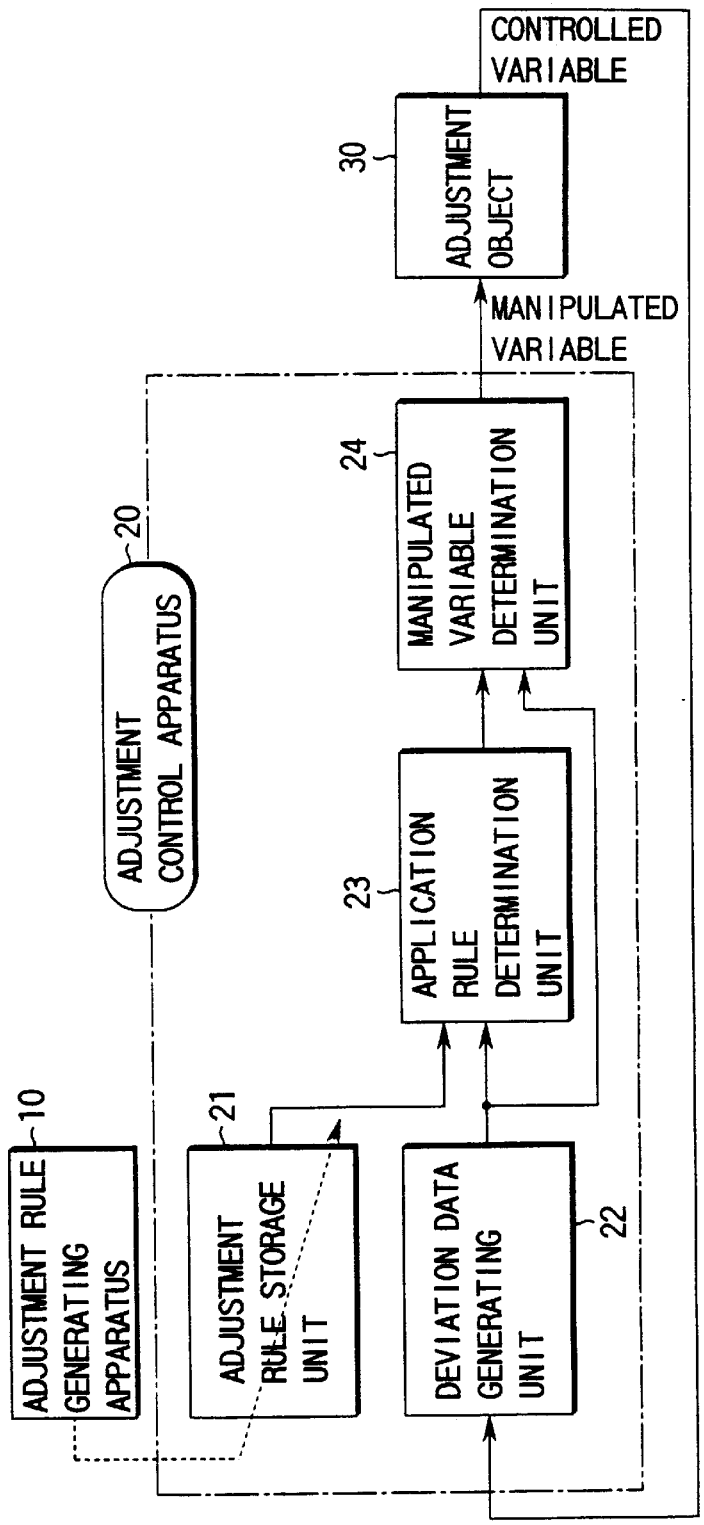
FIG. 11 is a block diagram showing the schematic arrangement of an adjustment control apparatus according to the third embodiment of the present invention.

FIG. 11 shows the arrangement of the adjustment control apparatus 20 according to the third embodiment. The adjustment control apparatus 20 comprises an adjustment rule storage unit 21, a deviation data generating unit 22, an application rule determination unit 23, and a manipulated variable determination unit 24 (refer chart 1 shown in FIG. 12).

The adjustment rule storage unit 21 stores adjustment rules obtained from the adjustment rule storage unit 21. The deviation data generating unit 22 calculates deviation (deviation amount) data from the desired output value. The application rule determination unit 23 determines a rule to be applied from the adjustment rules on the basis of the deviation data. sent from the deviation data generating unit 22 on the basis of the output from the adjustment object 30.

The manipulated variable determination unit 24 determines the value of the manipulated variable described in the rule determined by the application rule determination unit 23 and to be applied by multiplying it by a predetermined proportional coefficient in accordance with the deviation data obtained from the deviation data generating unit 22.

The case of the adjustment rules shown in Table 9 will be described. Assume that the adjustment object 30 has allowable deviations and situations as shown in Table 14. Let Yi be the output from the adjustment object 30, and di the desired output value. The deviation obtained from the deviation data generating unit 22 is given by ei = di −Yi (i is a positive integer). This deviation data is input to the output data application rule determination unit 23 (allowable deviation of each controlled variable), so the application rule is determined in the following manner.

TABLE 14

ALLOWABLE DEVIATION OF EACH CONTROLLED VARIABLE AND DEVIATION AT CERTAIN TIME POINT

| | CONTROLLED VARIABLE | | |
| --- | --- | --- | --- |
| | Y1 | Y2 | Y3 |
| ALLOWABLE DEVIATION | 0.5 | 0.5 | 0.5 |
| DEVIATION DATA | 3.0 | 0.1 | 2.5 |

As shown in Table 14, the allowable deviations of the controlled variables Yi are 0.5, 0.5, and 0.5. The deviations of the controlled variables Yi at a certain time point are 3.0, 0.1, and 2.5. A controlled variable Y2 falls within the allowable deviation, and the deviations of controlled variables Y1 and Y3 are out of the allowable deviation. Referring to the adjustment rule shown in Table 9, for the first rule ("rule 1)"), the third item is "2", and the controlled variables of the object are "1"and "2". The first rule is not applied to the case of Table 14 because it is a rule applied when both the controlled variables Y1 and Y2 are out of the allowable deviations.

For the second rule ("rule 2)"), the third item is "1", and the controlled variables of the object are "1" and "2". The second rule is applied when one of the deviations of the controlled variables Y1 and Y2 is out of the allowable deviation, and this applies to the above case. At this time, the second rule indicates "1" in the first item, i.e., that the controlled variable Y1 must be adjusted using the third manipulated variable X3.

As described above, the second rule is applied as the adjustment rule, so rule "3 1 1 1 2−1" based on this application rule is transferred to the manipulated variable determination unit 24.

The manipulated variable determination unit 24 calculates a correction amount u3 of the manipulated variable X3 by multiplying a deviation e1 of the controlled variable Y1 by a predetermined proportional coefficient k3 associated with the manipulated variable. If, in the adjustment rule, the manipulated variable is a gradient manipulated variable paired with an offset manipulated variable (when the third item of the adjustment rule is "1"), the direct deviation e1 of the controlled variable Y1 is not multiplied by the proportional coefficient. Instead, in consideration of the controlled variable Y2 which changes relative to the controlled variable Y1, the deviation of the controlled variable Y1 relative to the controlled variable Y2 (difference between the deviation of the controlled variable Y1 and that of the controlled variable Y2) is multiplied by the proportional coefficient k3, thereby calculating the correction amount of the manipulated variable (for a gradient manipulated variable which is not paired with an offset manipulated variable, the correction amount is calculated by simply multiplying the deviation by the proportional coefficient). More specifically, $$u3 = k3 \times (e1 - e2) = -1.0 \times 2.9 = -2.9 \tag{5}$$

(in this case, assume that k3 = −1.0)

With this processing, the adjustment object 30 has a new deviation.

The manipulated variable is repeatedly corrected in the above manner. When the deviations of all controlled variables converge within the allowable ranges, the application rule determination unit 23 determines that no rule need be applied, so the adjustment control apparatus 20 does not correct the manipulated variable of the adjustment object 30.

As described above, in this embodiment, the adjustment control apparatus 20 selects the manipulated variable to be corrected in accordance with the adjustment rules shown in Table 9 on the basis of the deviation data of the adjustment object 30, calculates the correction amount by multiplying the deviation by the proportional coefficient, and inputs the correction amount to the adjustment object 30. By repeating this operation, the deviations can be converged within the allowable range, thereby obtaining the desired output from the adjustment object 30.

(Fourth Embodiment)

<Third Arrangement of Adjustment Control Apparatus 20>

Figure 13:
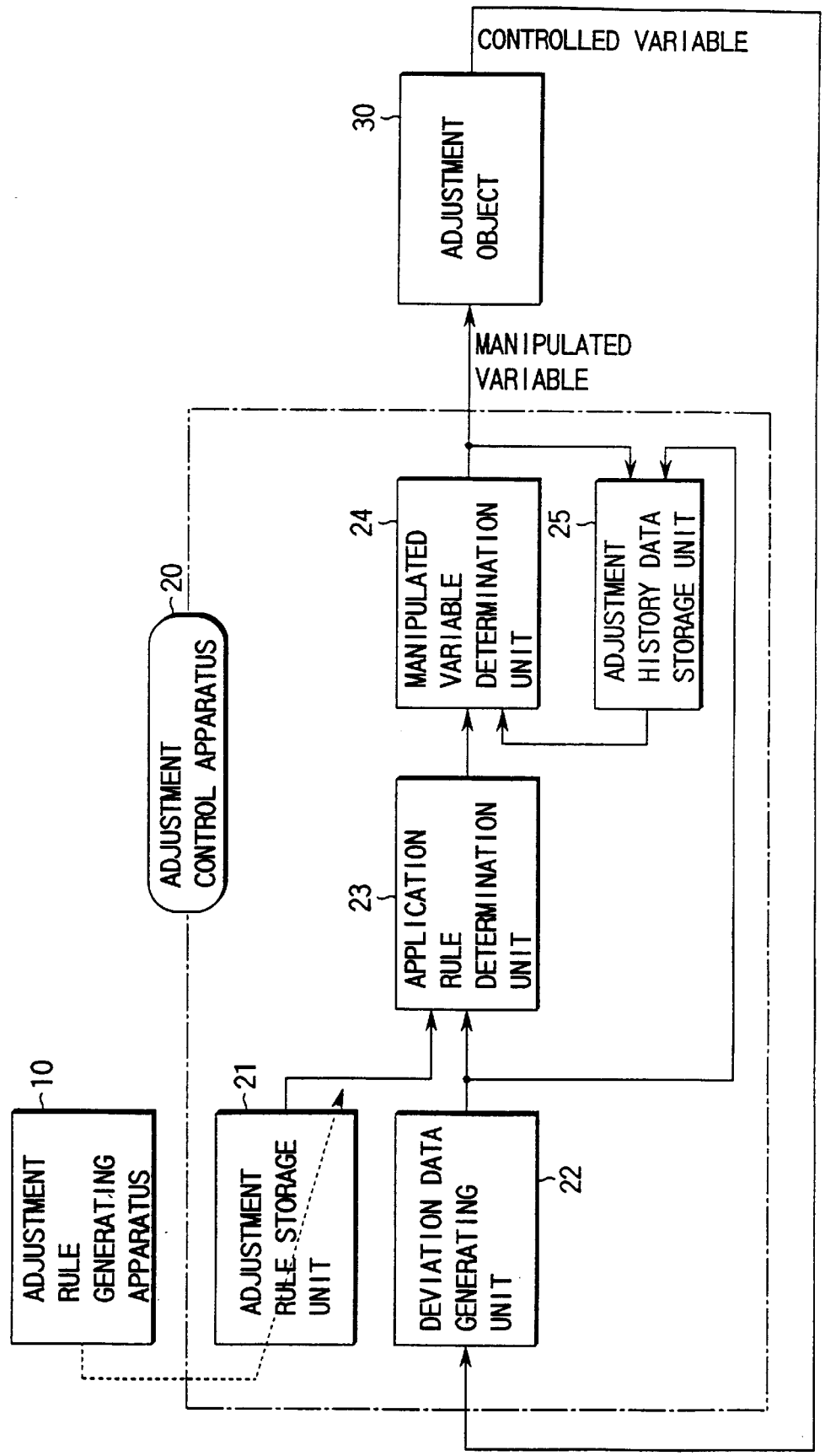
FIG. 13 is a block diagram showing the schematic arrangement of an adjustment control apparatus according to the fourth embodiment of the present invention.

FIG. 13 shows the arrangement of an adjustment control apparatus 20 according to the fourth embodiment. The adjustment control apparatus 20 of this embodiment is characterized in that an adjustment history data storage unit 25 is added to the adjustment control apparatus 20 of the third embodiment.

The adjustment history data storage unit 25 stores input and output values of an adjustment object 30 and deviation data obtained from a deviation data generating unit 22.

Figure 12:
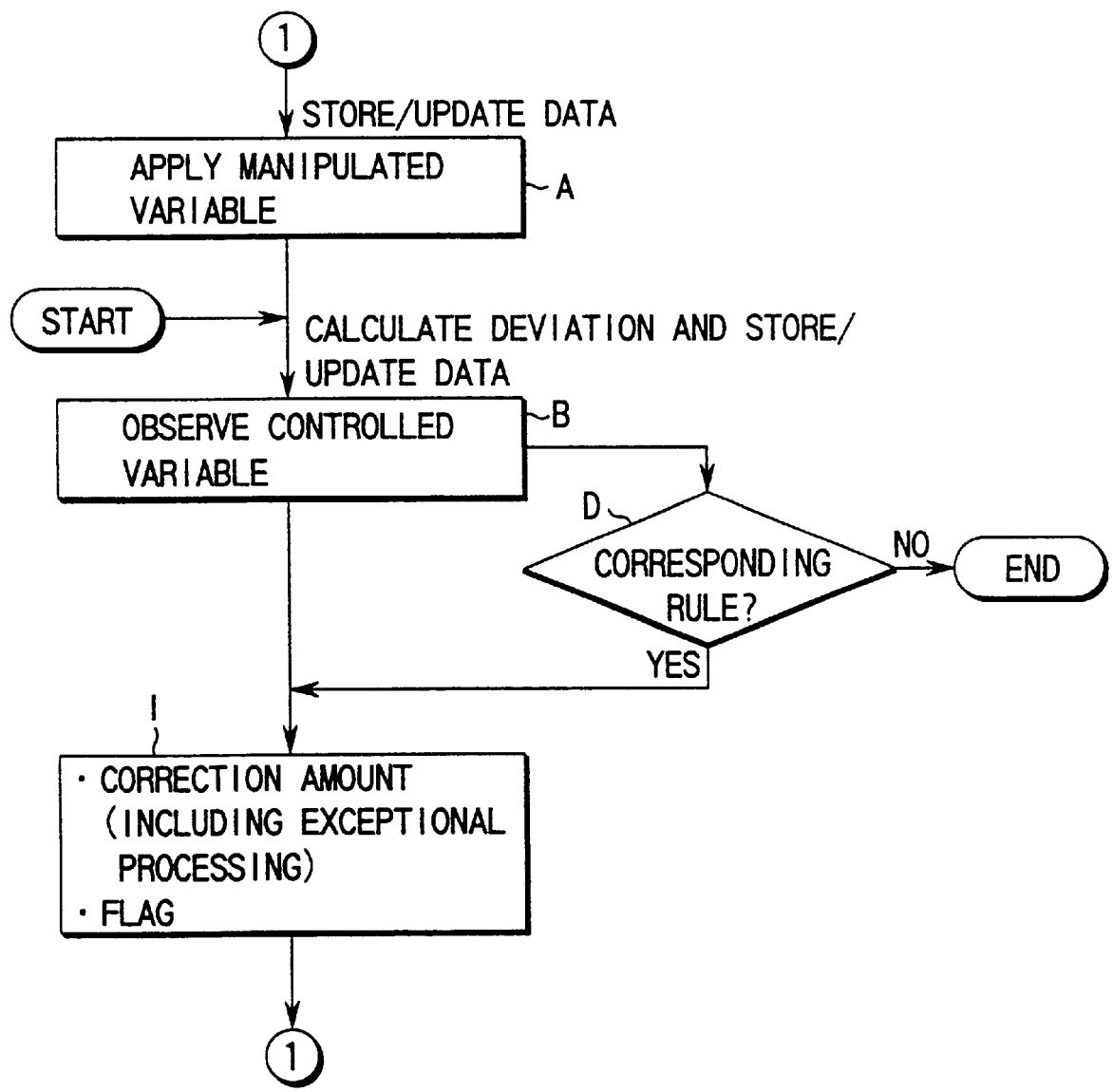
FIG. 12 is a view showing the chart 1 according to the third and fourth embodiment of the present invention.

A manipulated variable determination unit 24 determines the input to the adjustment object 30 with reference to not only the input and output values of the adjustment object 30 but also data in the adjustment history data storage unit 25 (refer chart 1 shown in FIG. 12).

The adjustment history data storage unit 25 stores adjustment history data as shown in Table 15 (deviation at adjustment count "0" is an initial deviation).

TABLE 15

| | ADJUSTMENT HISTORY | | | | | |
|---|---|---|---|---|---|---|
| ADJUST-MENT | CORRECTION AMOUNT | | | DEVIATION AFTER ADJUSTMENT | | |
| COUNT | u1 | u2 | u3 | e1 | e2 | e3 |
| 0 | 0.0 | 0.0 | 0.0 | 3.0 | 0.1 | 2.5 |
| 1 | 0.0 | 0.0 | −2.9 | 1.5 | 1.0 | 2.0 |
| 2 | 0.0 | −1.0 | 0.0 | −0.9 | −1.4 | −0.4 |
| 3 | 0.0 | 0.9 | 0.0 | 1.2 | 0.8 | 1.8 |
| 4 | 0.0 | −0.8 | 0.0 | −0.7 | −1.1 | −0.1 |
| . | . | | | . | | |
| . | . | | | . | | |
| . | . | | | . | | |

In this data, in the first adjustment, rule 2 in adjustment rule table 9 is selected in correspondence with the initial deviation, and a manipulated variable X3 is corrected by −2.9. From the second adjustment, rule 1 is selected, and a manipulated variable X2 is repeatedly corrected (since the manipulated variable X2 is an offset manipulated variable, the correction amount is calculated by directly multiplying the smaller one of the allowable deviations of controlled variables Y1 and Y2, which are out of the allowable ranges, by a proportional coefficient) (in this case, a proportional coefficient k2 for defining the correction amount of the manipulated variable X2 is set to be −1.0).

In this embodiment, the manipulated variable determination unit 24 refers to the adjustment history data. If the deviation vibrates between positive and negative values upon correcting the same manipulated variable, the proportional coefficient of the manipulated variable is multiplied by a weight to determine the manipulated variable. As in the above example, when the same manipulated variable is repeatedly corrected three or more times, and the deviation vibrates between positive and negative values, for the second manipulated variable, the proportional coefficient is multiplied by a weight of 0.5. In this case, the proportional coefficient is corrected as follows:

$$k'_i = 0.5 \times k_i \quad (6)$$
$$= 0.5 \times (-1.0)$$
$$= -0.5 \quad (7)$$
$$k_i^{def} = k'_i \quad (8)$$

With this processing, adjustment contents as shown in Table 16 are expected to be obtained from the fifth adjustment (that is, all deviations fall within the allowable ranges in the sixth adjustment).

TABLE 16

| | ADJUSTMENT HISTORY | | | | | |
|---|---|---|---|---|---|---|
| ADJUST-MENT | CORRECTION AMOUNT | | | DEVIATION AFTER ADJUSTMENT | | |
| COUNT | u1 | u2 | u3 | e1 | e2 | e3 |
| . | . | | | . | | |
| . | . | | | . | | |
| . | . | | | . | | |
| 4 | 0.0 | −0.8 | 0.0 | −0.7 | −1.1 | −0.1 |
| 5 | 0.0 | 0.35 | 0.0 | 0.1 | −0.3 | 0.7 |
| 6 | −0.7 | 0.0 | 0.0 | 0.4 | 0.4 | 0.1 |

A proportional coefficient k1 for defining the correction amount of a manipulated variable X1 is set to be −1.0.

As described above, the manipulated variable determination unit 24 of this embodiment has a function of not only determining the correction amount proportional to the manipulated variable but also exceptionally determining the correction amount of the manipulated variable in accordance with conditions in correspondence with the output characteristics of the adjustment object 30 in the adjustment process.

An example in which the deviation of the adjustment object 30 vibrates between positive and negative values upon repeatedly correcting the same manipulated variable has been described above. In addition, processing as shown in Table 17 is performed in accordance with conditions.

TABLE 17

| EXCEPTIONAL PROCESSING | |
|---|---|
| CONDITION | PROCESSING |
| DEVIATION VIBRATES BETWEEN POSITIVE AND NEGATIVE VALUES UPON REPEATEDLY CORRECTING THE SAME MANIPULATED VARIABLE | PROPORTIONAL COEFFICIENT IS MULTIPLIED BY WEIGHT (0 TO 1) (ABOVE EXAMPLE) |
| DEVIATION HAVING THE SAME SIGN IS REPEATEDLY OBTAINED UPON REPEATEDLY CORRECTING THE SAME MANIPULATED VARIABLE | PROPORTIONAL COEFFICIENT IS MULTIPLIED BY WEIGHT (1 OR MORE) |
| DEVIATION INCREASES WITHOUT CHANGING SIGN UPON CORRECTING MANIPULATED VARIABLE | SIGN OF PROPORTIONAL COEFFICIENT IS INVERTED |
| DEVIATION DOES NOT CHANGE UPON CORRECTING MANIPULATED VARIABLE | ANOTHER PREDETERMINED (ONE OR MORE) MANIPULATED VARIABLE IS CORRECTED BY PREDETERMINED AMOUNT |

Table 17 shows exceptional processing condition processing. When "the deviation vibrates between positive and negative values upon repeatedly correcting the same manipulated variable", "the proportional coefficient is multiplied by a weight (0 to 1)". When "a deviation with the same sign is repeatedly obtained upon repeatedly correcting the same manipulated variable", "the proportional coefficient is multiplied by a weight (1 or more)". When "the deviation increases without changing the sign upon correcting the manipulated variable", "the sign of the proportional coefficient is inverted". When "the deviation does not change upon correcting the manipulated variable", "other (one or more) predetermined manipulated variables are corrected by a predetermined amount".

<Fourth Arrangement of Adjustment Control Apparatus 20>

Figure 14:
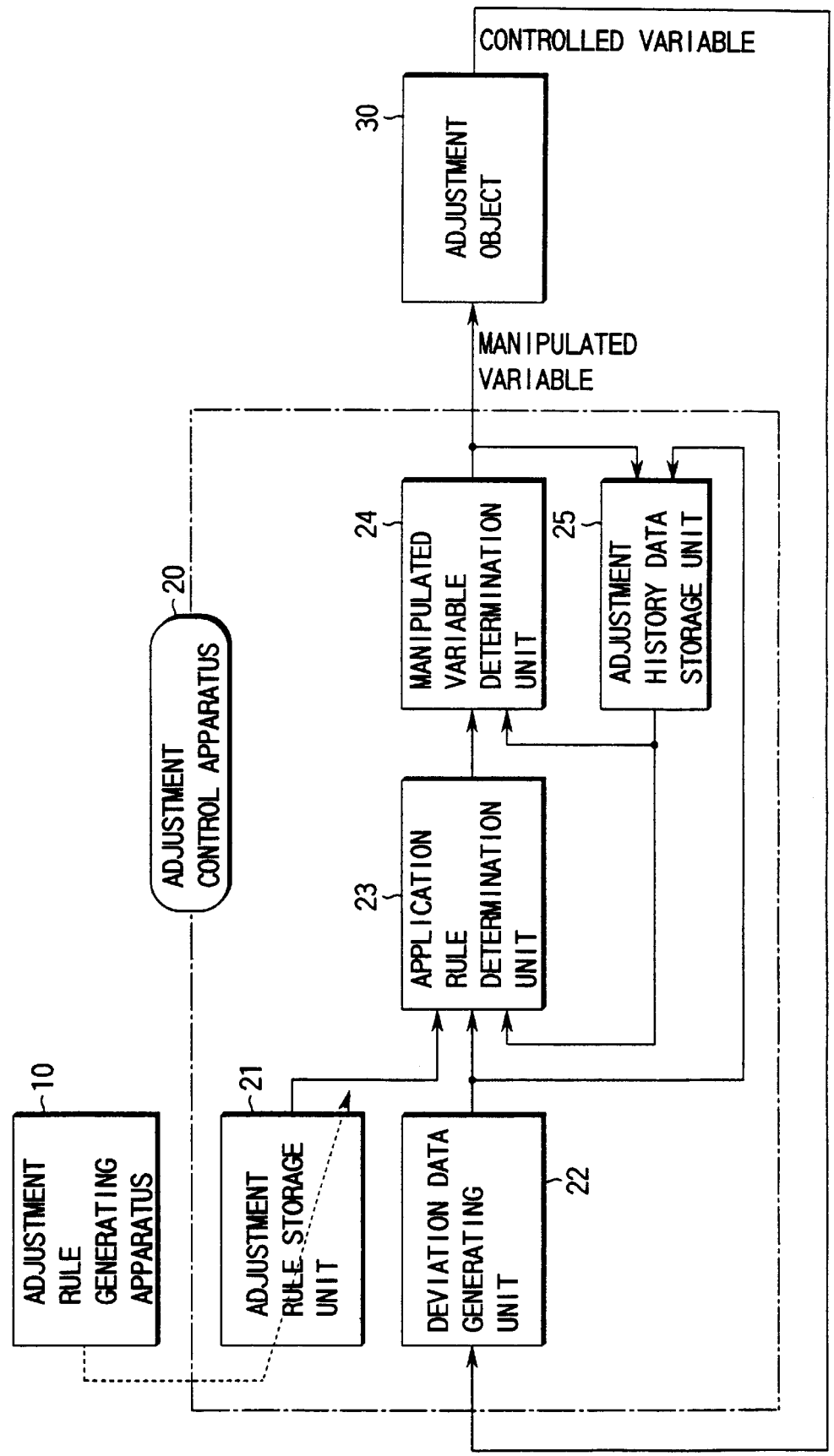
FIG. 14 is a block diagram showing the schematic arrangement of an adjustment control apparatus according to the fifth embodiment of the present invention.

FIG. 14 is a block diagram showing the arrangement of an adjustment control apparatus 20 according to the fifth embodiment. This embodiment is characterized in that history data is positively used in the manipulated variable determination unit 24 of the fourth embodiment. The apparatus has almost the same arrangement as that of the fourth embodiment (the difference from the arrangement shown in FIG. 12 is that an application rule determination unit 23 refers to history data) except the data and manipulated variable determination scheme.

Figure 15:
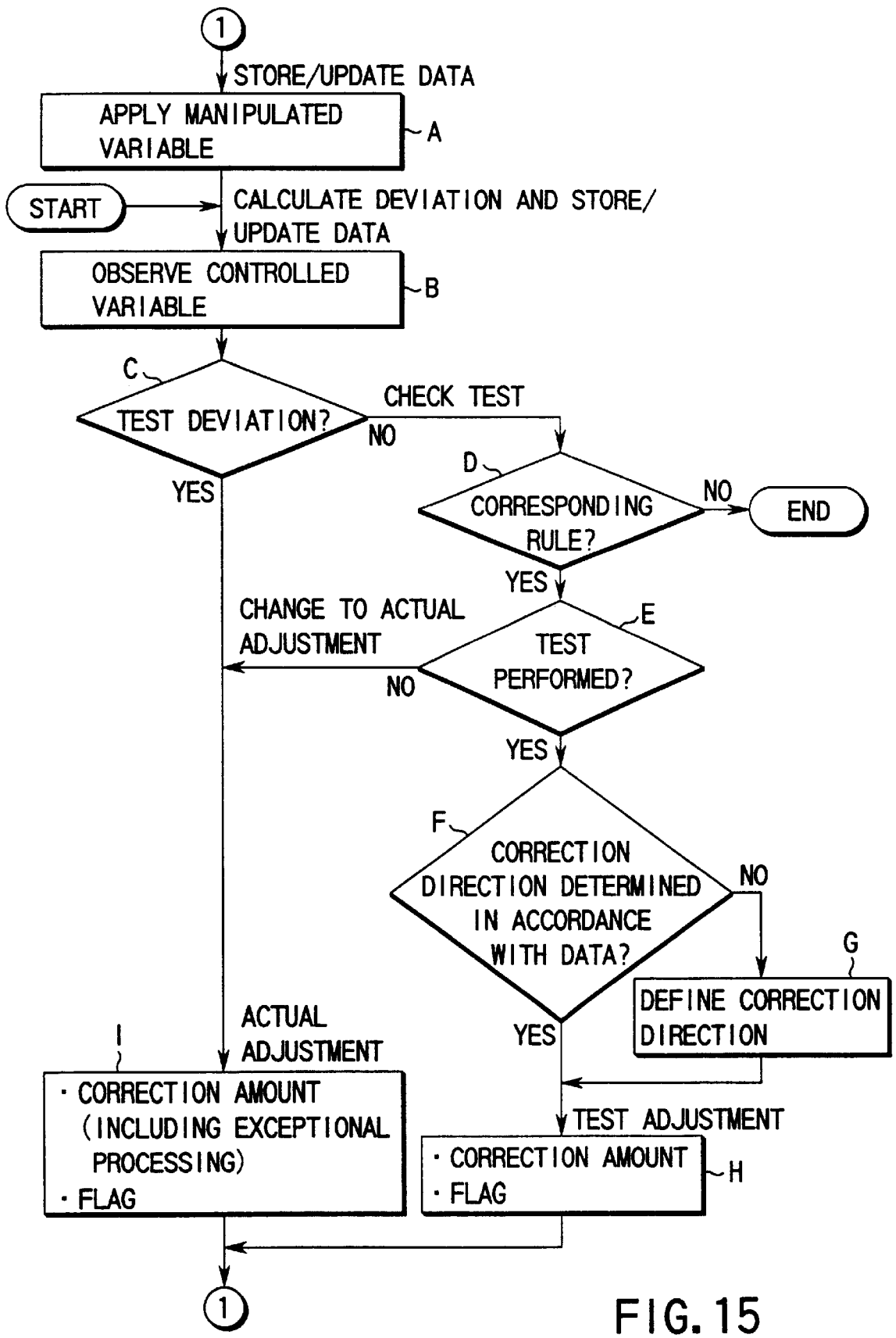
FIG. 15 is a view showing the chart 2 according to the fifth embodiment of the present invention.

In the manipulated variable determination unit 24 of this embodiment, the correction amount of the manipulated variable is not simply determined in proportion to the deviation, unlike the fourth embodiment, but calculated using past history data (chart 2 shown in FIG. 15).

More specifically, assume that, for the initial deviation shown in Table 14, a manipulated variable X3 is to be corrected on the basis of "rule 2". One adjustment is sacrificed to perform "test adjustment" for a trial to correct the manipulated variable by a predetermined amount. Simultaneously, the deviation of the adjustment object after correction of the manipulated variable is calculated, and history data as shown in Table 18 is stored in a history data storage unit 25. In this case, a test correction amount u3test is set to be 1.0.

TABLE 18

ADJUSTMENT HISTORY

| ADJUST-MENT COUNT | ACTUAL ADJUST-MENT (0) OR TEST ADJUST-MENT (1) | CORRECTION AMOUNT | | | DEVIATION AFTER ADJUSTMENT | | |
|---|---|---|---|---|---|---|---|
| | | u1 | u2 | u3 | e1 | e2 | e3 |
| 0 | 0 | 0.0 | 0.0 | 0.0 | 3.0 | 0.1 | 2.5 |
| 1 | 1 | 0.0 | 0.0 | 1.0 | 3.5 | −0.3 | 2.7 |

In adjustment history shown in Table 18, the manipulated variable is not corrected at adjustment count "0", although it means "0" of actual adjustment for the convenience of data format.

The adjustment control apparatus 20 of this embodiment is characterized in that data at adjustment count "1" is used in the situation shown in Table 18 to obtain the correction amount of the manipulated variable X3 at adjustment count "2", and adjustment is performed using the correction amount as a determination reference.

Details will be described.

First, the application rule determination unit 23 refers to the history data stored in the history data storage unit 25. If the current situation is immediately after test adjustment, the next processing is actual adjustment. Therefore, the rule selected for the previous test adjustment is determined as an application rule independently of the deviation after test adjustment.

The manipulated variable determination unit 24 determines the correction amount of the manipulated variable using data before and after test adjustment in the following manner. According to "rule 2", the manipulated variable X3 corresponds to controlled variables Y1 and Y2. The controlled variable Y1 is to be corrected by the manipulated variable X3. As described above in the third embodiment, the manipulated variable X3 is a gradient manipulated variable paired with an offset manipulated variable, as is apparent from "rule 2", so the manipulated variable X3 changes the corresponding controlled variables Y1 and Y2 relative to each other.

The relative change amount between the deviation of the controlled variable Y1 and that of the controlled variable Y2 before and after test adjustment is calculated. The correction amount of the manipulated variable X3 is calculated on the basis of equation (9) such that the relative deviation component (difference between the deviation of the controlled variable Y1 and that of the controlled variable Y2) between the current controlled variable Y1 and the controlled variable Y2 is canceled. In Table 18, $$u_3 = -\gamma \times \frac{e_1 - e_2}{\Delta e_1 - \Delta e_2} \times u_3^{test} - u_3^{test} \qquad (9)$$

$$= -1.0 \times \frac{3.0 - 0.1}{(3.5 - 3.0) - (-0.3 - 0.1)} \times 1.0 - 1.0$$

$$\cong -4.2 \qquad (10)$$

where γ is a coefficient as the reliability of the calculated amount. This coefficient will be called a reliability coefficient in distinction from the proportional coefficient in the third or fourth embodiment.

Assume that when this correction amount is applied to an adjustment object 30, the history data is updated, and an adjustment history as shown in Table 19 is obtained.

TABLE 19

ADJUSTMENT HISTORY

| ADJUST-MENT COUNT | ACTUAL ADJUST-MENT (0) OR TEST ADJUST-MENT (1) | CORRECTION AMOUNT | | | DEVIATION AFTER ADJUSTMENT | | |
|---|---|---|---|---|---|---|---|
| | | u1 | u2 | u3 | e1 | e2 | e3 |
| 0 | 0 | 0.0 | 0.0 | 0.0 | 3.0 | 0.1 | 2.5 |
| 1 | 1 | 0.0 | 0.0 | 1.0 | 3.5 | −0.3 | 2.7 |
| 2 | 0 | 0.0 | 0.0 | −4.2 | 1.4 | 0.9 | 2.0 |

As in the case of the third embodiment, the deviation of the controlled variable Y2 falls out of the allowable deviation, so the application rule determination unit 23 selects "rule 1" for the next adjustment (i.e., test adjustment). According to "rule 1", the manipulated variable X2 is selected. In test adjustment, a predetermined test correction amount, and in this case, u3test = 1.0, is applied to the adjustment object 30, and the deviation of the controlled variable is updated shown in Table 20.

TABLE 20

ADJUSTMENT HISTORY

| ADJUST-MENT COUNT | ACTUAL ADJUST-MENT (0) OR TEST ADJUST-MENT (1) | CORRECTION AMOUNT | | | DEVIATION AFTER ADJUSTMENT | | |
|---|---|---|---|---|---|---|---|
| | | u1 | u2 | u3 | e1 | e2 | e3 |
| 0 | 0 | 0.0 | 0.0 | 0.0 | 3.0 | 0.1 | 2.5 |
| 1 | 1 | 0.0 | 0.0 | 1.0 | 3.5 | −0.3 | 2.7 |
| 2 | 0 | 0.0 | 0.0 | −4.2 | 1.4 | 0.9 | 2.0 |
| 3 | 1 | 0.0 | 1.0 | 0.0 | 3.6 | 3.1 | 4.2 |

In actual adjustment, deviation data before and after test adjustment is used. Since the manipulated variable X2 is an offset manipulated variable, the change amount in the smaller one of the deviations of controlled variables to be adjusted is directly used. More specifically, $$u_2 = -\beta \times \frac{\min\{e_1, e_2\}}{\Delta\min\{e_1, e_2\}} \times u_2^{test} - u_2^{test} \quad (11)$$

$$= -\beta \times \frac{e_2}{\Delta e_2} \times u_2^{test} - u_2^{test}$$

$$= -1.0 \times \frac{0.9}{3.1 - 0.9} \times 1.0 - 1.0$$

$$\cong -1.4 \quad (12)$$

where $\beta$ is the reliability coefficient for the manipulated variable X2 and is set to be 1.0.

When this correction amount is applied to the adjustment object 30, the history data is updated, and adjustment history as shown in Table 21 is obtained.

TABLE 21

ADJUSTMENT HISTORY

| ADJUST-MENT COUNT | ACTUAL ADJUST-MENT (0) OR TEST ADJUST-MENT (1) | CORRECTION AMOUNT | | | DEVIATION AFTER ADJUSTMENT | | |
|---|---|---|---|---|---|---|---|
| | | u1 | u2 | u3 | e1 | e2 | e3 |
| 0 | 0 | 0.0 | 0.0 | 0.0 | 3.0 | 0.1 | 2.5 |
| 1 | 1 | 0.0 | 0.0 | 1.0 | 3.5 | −0.3 | 2.7 |
| 2 | 0 | 0.0 | 0.0 | −4.2 | 1.4 | 0.9 | 2.0 |
| 3 | 1 | 0.0 | 1.0 | 0.0 | 3.6 | 3.1 | 4.2 |
| 4 | 0 | 0.0 | −1.4 | 0.0 | 0.4 | −0.1 | 1.0 |

In Table 21, only a controlled variable Y3 is out of the allowable deviation. For the next test adjustment, adjustment rule 3 is selected, and a manipulated variable X1 is selected as a manipulated variable to be corrected. Assume that a test correction amount u1test is 1.0, and the history data as shown in Table 22 is obtained after test adjustment of the adjustment object 30

TABLE 22

ADJUSTMENT HISTORY

| ADJUST-MENT | ACTUAL ADJUST-MENT (0) OR TEST ADJUST-MENT (1) | CORRECTION AMOUNT | | | DEVIATION AFTER ADJUSTMENT | | |
|---|---|---|---|---|---|---|---|
| COUNT | | u1 | u2 | u3 | e1 | e2 | e3 |
| 0 | 0 | 0.0 | 0.0 | 0.0 | 3.0 | 0.1 | 2.5 |
| 1 | 1 | 0.0 | 0.0 | 1.0 | 3.5 | −0.3 | 2.7 |
| 2 | 0 | 0.0 | 0.0 | −4.2 | 1.4 | 0.9 | 2.0 |
| 3 | 1 | 0.0 | 1.0 | 0.0 | 3.6 | 3.1 | 4.2 |
| 4 | 0 | 0.0 | −1.4 | 0.0 | 0.4 | −0.1 | 1.0 |
| 5 | 1 | 1.0 | 0.0 | 0.0 | 0.4 | 0.1 | 1.9 |

According to "rule 3", the manipulated variable X1 is a gradient manipulated variable which is not paired with an offset manipulated variable. Therefore, like the offset manipulated variable, the change amount of the smallest one of the deviations of corresponding controlled variables before and after test adjustment is used to calculate the correction amount of the manipulated variable.

$$u_1 = -\alpha \times \frac{\min\{e_3\}}{\Delta\min\{e_3\}} \times u_1^{test} - u_1^{test} \quad (13)$$

$$= -1.0 \times \frac{1.0}{1.9 - 1.0} \times 1.0 - 1.0$$

$$\cong -2.1 \quad (14)$$

This correction amount is applied to the adjustment object 30, the history data is updated, and adjustment history as shown in Table 23 is obtained.

TABLE 23

ADJUSTMENT HISTORY

| ADJUST-MENT COUNT | ACTUAL ADJUST-MENT (0) OR TEST ADJUST-MENT (1) | CORRECTION AMOUNT | | | DEVIATION AFTER ADJUSTMENT | | |
|---|---|---|---|---|---|---|---|
| | | u1 | u2 | u3 | e1 | e2 | e3 |
| 0 | 0 | 0.0 | 0.0 | 0.0 | 3.0 | 0.1 | 2.5 |
| 1 | 1 | 0.0 | 0.0 | 1.0 | 3.5 | −0.3 | 2.7 |
| 2 | 0 | 0.0 | 0.0 | −4.2 | 1.4 | 0.9 | 2.0 |
| 3 | 1 | 0.0 | 1.0 | 0.0 | 3.6 | 3.1 | 4.2 |
| 4 | 0 | 0.0 | −1.4 | 0.0 | 0.4 | −0.1 | 1.0 |
| 5 | 1 | 1.0 | 0.0 | 0.0 | 0.4 | −0.1 | 1.9 |
| 6 | 0 | −2.1 | 0.0 | 0.0 | 0.4 | −0.1 | −0.1 |

In Table 23, all deviations fall within the allowable deviations. For this reason, in the next test adjustment, the application rule determination unit 23 determines "no application rule", and correction of the manipulated variable of the adjustment object 30 is ended.

In this embodiment, exceptional processing by the manipulated variable determination unit 24 can be performed, as in the fifth embodiment. Especially, in this embodiment, adjustment is separately performed in test adjustment and actual adjustment, so an example in which exceptional processing in the fifth embodiment is separated into test adjustment and actual adjustment, and the proportional coefficient is replaced with the reliability coefficient will be described.

This corresponds to processing contents as shown in Table 24.

TABLE 24

EXCEPTIONAL PROCESSING

| CONDITION | PROCESSING |
|---|---|
| DEVIATION VIBRATES BETWEEN POSITIVE AND NEGATIVE VALUES UPON REPEATEDLY CORRECTING THE SAME MANIPULATED VARIABLE IN ACTUAL ADJUSTMENT | PROPORTIONAL COEFFICIENT IS MULTIPLIED BY WEIGHT (0 TO 1) |
| DEVIATION HAVING THE SAME SIGN IS REPEATEDLY OBTAINED UPON REPEATEDLY CORRECTING THE SAME MANIPULATED VARIABLE IN ACTUAL ADJUSTMENT | RELIABILITY COEFFICIENT IS MULTIPLIED BY WEIGHT (1 OR MORE) |

TABLE 24-continued

EXCEPTIONAL PROCESSING

| CONDITION | PROCESSING |
|---|---|
| DEVIATION INCREASES WITHOUT CHANGING SIGN UPON ACTUAL ADJUSTMENT | SIGN OF RELIABILITY COEFFICIENT IS INVERTED |
| DEVIATION DOES NOT CHANGE UPON TEST ADJUSTMENT | ANOTHER PREDETERMINED (ONE OR MORE) MANIPULATED VARIABLE IS CORRECTED BY PREDETERMINED AMOUNT IN ACTUAL ADJUSTMENT (DEAD BAND) |
| DEVIATION DOES NOT CHANGE UPON ACTUAL ADJUSTMENT | ANOTHER PREDETERMINED (ONE OR MORE) MANIPULATED VARIABLE IS CORRECTED BY PREDETERMINED AMOUNT IN ACTUAL ADJUSTMENT (DEAD BAND) |

When "the deviation vibrates between positive and negative values upon repeatedly correcting the same manipulated variable in actual adjustment", "the reliability coefficient is multiplied by a weight (0 to 1)". When "a deviation with the same sign is repeatedly obtained upon repeatedly correcting the same manipulated variable in actual adjustment", "the reliability coefficient is multiplied by a weight (1 or more)". When "the deviation increases without changing the sign upon actual adjustment", "the sign of the reliability coefficient is inverted". When "the deviation does not change in test adjustment", "other (one or more) predetermined manipulated variables are corrected by a predetermined amount in actual adjustment (dead band)". When "the deviation does not change in actual adjustment", "other (one or more) predetermined manipulated variables are corrected by a predetermined amount in actual adjustment (dead band)".

The manipulated variable determination unit 24 may continuously perform test adjustment or actual adjustment, as needed. This operation is effective when the manipulated variable is limited within an infinite range, or adjustment is performed on an assumption of repetitive operation under a situation where the operation is likely to fail.

(Sixth Embodiment)

<Arrangement of Adjustment Possibility Evaluation Apparatus 40>

Figure 16:
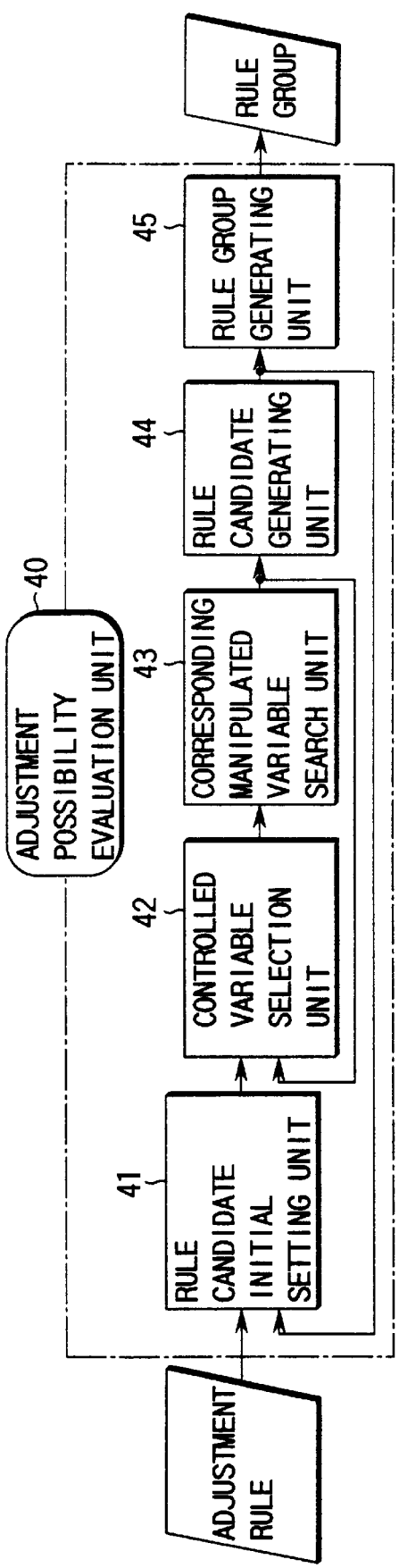
FIG. 16 is a block diagram showing the schematic arrangement of an adjustment possibility evaluation unit according to the sixth embodiment of the present invention.

FIG. 16 shows the arrangement of an adjustment possibility evaluation apparatus 40 of the sixth embodiment. The adjustment possibility evaluation apparatus 40 evaluates whether the adjustment object can be adjusted by an adjustment rule on the basis of the "adjustment rules" described in the second embodiment.

In the rule generating apparatus described in the second embodiment, controlled variables and manipulated variables for adjusting the controlled variables do not always correspond in one-to-one correspondence depending on the manner for preparing the dependency table. In such a case, the rule generating apparatus of the second embodiment lists up all controlled variables that the apparatus can cope with.

In such a case, the adjustment possibility evaluation apparatus 40 of the sixth embodiment changes adjustment rules such that all controlled variables can be adjusted independently of the deviation situation.

A dependency table shown in Table 25 shows the characteristics of the adjustment object, which are different from those in Table 4 (the number of inputs/outputs is 3).

TABLE 25

DEPENDENCY TABLE

| 3 | | |
|---|---|---|
| 1 | 1 | 1 |
| 0 | 1 | 1 |
| 1 | 1 | 0 |
| 1 | 1 | 0 |

Accordingly, As shown in Table 26, adjustment rules obtained by the rule generating apparatus of the second embodiment are also different from those in Table 9.

TABLE 26

ADJUSTMENT RULE CORRESPONDING TO DEPENDENCY TABLE IN TABLE 22

| 2 | 1 | 0 | 2 | 3 | −1 |
|---|---|---|---|---|---|
| 1 | 1 | 0 | 2 | 3 | −1 |
| 3 | 1 | 0 | 1 | −1 | |

The adjustment rule in this format indicates that "even when the deviations of both the second and third controlled variables are out of the allowable ranges, and the second controlled variable is adjusted by the second manipulated variable to converge the deviation of the second controlled variable within the allowable range, adjustment is further performed using the second manipulated variable unless the deviation of the third controlled variable simultaneously falls within the allowable range" (this is because a condition for the deviations of a plurality of controlled variables to be adjusted by the manipulated variable is not designated as the third item of each rule is "0").

With this processing, the deviation of the third controlled variable, which has been adjusted once, may increase, and the adjustment possibility is not guaranteed. In this case, the adjustment possibility evaluation apparatus 40 of this embodiment changes the format such that the controlled variables and manipulated variables correspond in one-to-one correspondence in adjustment, i.e., the second controlled variable is adjusted by the second manipulated variable, and the third controlled variable is adjusted by the first manipulated variable.

The arrangement of the adjustment possibility evaluation apparatus 40 and the flow of processing by this arrangement will be described below with reference to the block diagram shown in FIG. 16. As shown in FIG. 16, the adjustment possibility evaluation apparatus 40 comprises a rule candidate initial setting unit 41, a controlled variable selection unit 42, a corresponding manipulated variable search unit 43, a rule candidate generating unit 44, and a rule group generating unit 45.

The rule candidate initial setting unit 41 performs initial setting of rule candidates. The rule candidate initial setting unit 41 determines the pattern of the selection order of controlled variables and initializes the correspondence data between the controlled variables and manipulated variables. In the dependency table shown in Table 25, the adjustment object has three controlled variables. First, the order for checking whether the controlled variables can be adjusted is determined. In this case, the-number of orders is:

$$_3P_3 = 3! = 6 \tag{15}$$

At this time, the selection order of controlled variables is set as rule candidate data as shown in Table 27. One sequence of controlled variables corresponds to one rule candidate.

Currently, the correspondence between the controlled variable and manipulated variable is not checked for any one of candidate numbers 1 to 6, so "0" is set in the item "checked".

TABLE 27

RULE CANDIDATE DATA

| CANDIDATE NUMBER | ORDER OF SELECTION | | | CHECKED |
|---|---|---|---|---|
| 1 | 1 | 2 | 3 | 0 |
| 2 | 1 | 3 | 2 | 0 |
| 3 | 2 | 1 | 3 | 0 |
| 4 | 2 | 3 | 1 | 0 |
| 5 | 3 | 1 | 2 | 0 |
| 6 | 3 | 2 | 1 | 0 |

Simultaneously, data representing correspondence between a controlled variable and a manipulated variable for adjusting the controlled variable is initialized (Table 28).

TABLE 28

CORRESPONDENCE DATA

| MANIPU-LATED VARIABLE | CONTROLLED VARIABLE | | |
|---|---|---|---|
|  | Y1 | Y2 | Y3 |
| X1 | 0 | 0 | 0 |
| X2 | 0 | 0 | 0 |
| X3 | 0 | 0 | 0 |

Next, the controlled variable selection unit 42 selects one controlled variable which does not correspond to any manipulated variable (controlled variable for which all correspondence data for manipulated variables are "0") in correspondence data from rule candidates with high priority (with small candidate numbers) which have not been checked ("0"). In this case, a first controlled variable Y1 as candidate 1 is selected.

The corresponding manipulated variable search unit 43 selects a manipulated variable corresponding to the selected first controlled variable on the basis of the input adjustment rule shown in Table 26 and updates the correspondence data in Table 28. More specifically, Table 26 is searched from the upper rule for a manipulated variable corresponding to the first controlled variable Y1. The correspondence data is updated on the basis of the search result. In this case, only a third manipulated variable X3 corresponds to the controlled variable Y1, so the correspondence data is updated like in Table 29.

TABLE 29

CORRESPONDENCE DATA

| MANIPU-LATED VARIABLE | CONTROLLED VARIABLE | | |
|---|---|---|---|
|  | Y1 | Y2 | Y3 |
| X1 | 0 | 0 | 0 |
| X2 | 0 | 0 | 0 |
| X3 | 1 | 0 | 0 |

Since all controlled variables of the selected rule candidate have not been checked yet, the flow returns to processing in the controlled variable selection unit 42 to select the next controlled variable.

The controlled variable at the second order is a second controlled variable Y2. A corresponding manipulated variable is checked on the basis of the adjustment rules, as described above. The second manipulated variable is selected according to rule 1.

The same processing is repeated for the third controlled variable of the third order, and the adjustment rules are checked. A third controlled variable Y3 also corresponds to the second controlled variable on the basis of rule 1. However, since the second manipulated variable has already been designated to correspond to the second controlled variable, the third controlled variable cannot correspond to the second manipulated variable. In this case, rule 2 also corresponds to the third controlled variable, and eventually, the first manipulated variable is made to correspond to the third controlled variable. With the above check processing, the correspondence data is updated to Table 30.

TABLE 30

CORRESPONDENCE DATA IN RULE CANDIDATE 1

| MANIPU-LATED VARIABLE | CONTROLLED VARIABLE | | |
|---|---|---|---|
|  | Y1 | Y2 | Y3 |
| X1 | 0 | 0 | 1 |
| X2 | 0 | 1 | 0 |
| X3 | 1 | 0 | 0 |

The rule candidate generating unit 44 searches for the correspondence data from the manipulated variables in accordance with the order of adjustment rules shown in Table 26, converts the table into a format as shown in Table 26, and stores it. In this case, Table 31 is obtained. That is, adjustment rules shown in Table 31 are obtained in correspondence with "rule candidate 1" and stored.

TABLE 31

ADJUSTMENT RULE CORRESPONDING TO RULE CANDIDATE 1

| 2 | 1 | 0 | 2 | −1 |
| 1 | 1 | 0 | 3 | −1 |
| 3 | 1 | 0 | 1 | −1 |

Check of the correspondence for "rule candidate 1" is complete, although candidates 2 to 6 have not been checked yet. The rule candidate initial setting unit 41 changes "0" of rule candidate 1 which has already been checked to "1" in the rule candidate data shown in Table 27. The rule candidate generating unit 44 also initializes the correspondence table to the state shown in Table 28 for "rule candidate 2".

The above processing is repeated for "rule candidate 2". Since the check order of controlled variables changes such that the second controlled variable Y2 and the third controlled variable Y3 are exchanged, candidate rules shown in Table 32 are obtained.

TABLE 32

ADJUSTMENT RULE CORRESPONDING TO RULE CANDIDATE 2

| 2 | 1 | 0 | 2 | −1 |
| 1 | 1 | 0 | 3 | −1 |
| 3 | 1 | 0 | 1 | −1 |

Similarly, "rule candidate 3" to "rule candidate 6" are also checked, and candidate rules as shown in Table 33 are stored in the rule candidate generating unit 44.

TABLE 33

CANDIDATE RULE OF RULE CANDIDATE GENERATING UNIT 44

| CANDIDATE NUMBER | CANDIDATE RULE | | | | |
|---|---|---|---|---|---|
| 1 | 2 | 1 | 0 | 2 | −1 |
| 1 | 1 | 1 | 0 | 3 | −1 |
| 1 | 3 | 1 | 0 | 1 | −1 |
| 2 | 2 | 1 | 0 | 3 | −1 |
| 2 | 1 | 1 | 0 | 2 | −1 |
| 2 | 3 | 1 | 0 | 1 | −1 |
| 3 | 2 | 1 | 0 | 2 | −1 |
| 3 | 1 | 1 | 0 | 3 | −1 |
| 3 | 3 | 1 | 0 | 1 | −1 |
| 4 | 2 | 1 | 0 | 2 | −1 |
| 4 | 1 | 1 | 0 | 3 | −1 |
| 4 | 3 | 1 | 0 | 1 | −1 |
| 5 | 2 | 1 | 0 | 3 | −1 |
| 5 | 1 | 1 | 0 | 2 | −1 |
| 5 | 3 | 1 | 0 | 1 | −1 |
| 6 | 2 | 1 | 0 | 3 | −1 |
| 6 | 1 | 1 | 0 | 2 | −1 |
| 6 | 3 | 1 | 0 | 1 | −1 |

The rule group generating unit 45 omits same rules from the stored candidate rules and outputs the remaining as a rule group (Table 34).

TABLE 34

RULE GROUP (OUTPUT)

| CANDIDATE NUMBER | CANDIDATE RULE | | | | |
|---|---|---|---|---|---|
| 1 | 2 | 1 | 0 | 2 | −1 |
| 1 | 1 | 1 | 0 | 3 | −1 |
| 1 | 3 | 1 | 0 | 1 | −1 |
| 2 | 2 | 1 | 0 | 3 | −1 |
| 2 | 1 | 1 | 0 | 2 | −1 |
| 2 | 3 | 1 | 0 | 1 | −1 |

(Seventh Embodiment)

<Arrangement of Automatic Adjustment Rule Candidate Generating Apparatus 50>

Figure 17:
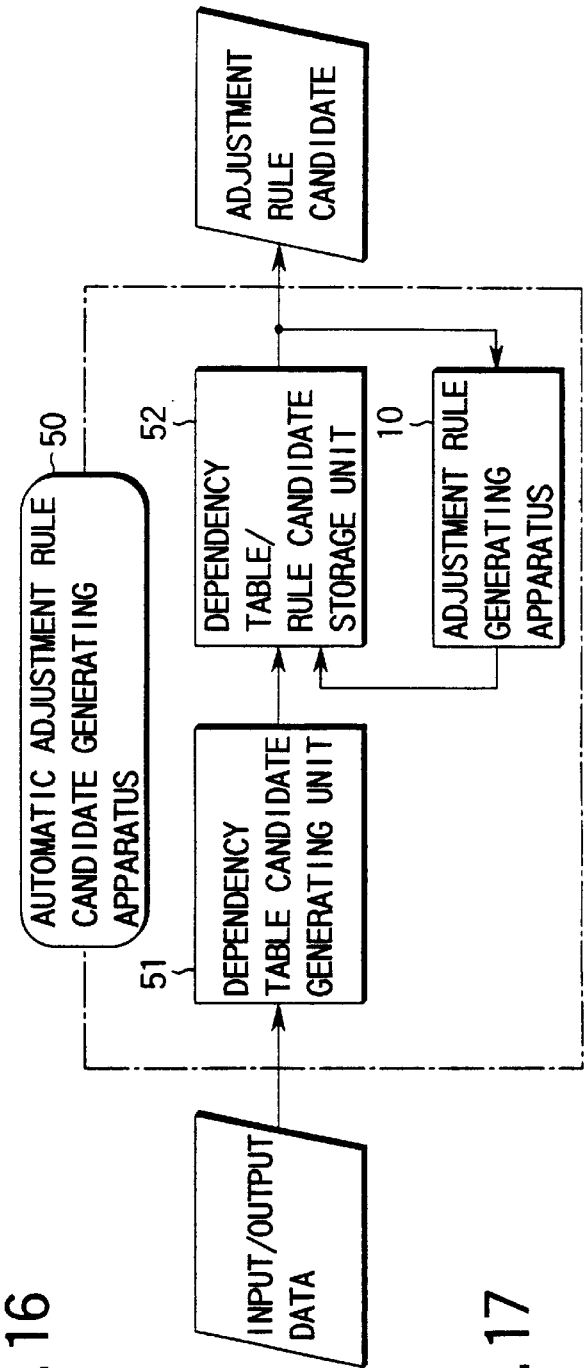
FIG. 17 is a block diagram showing the schematic arrangement of an automatic adjustment rule candidate generating apparatus according to the seventh embodiment of the present invention.

FIG. 17 shows the arrangement of an automatic adjustment rule candidate generating apparatus 50 according to the seventh embodiment. As shown in FIG. 17, the automatic adjustment rule candidate generating apparatus 50 comprises a dependency table candidate generating unit 51, a dependency table/rule candidate storage unit 52, and an adjustment rule generating apparatus 10.

When the input/output data of an adjustment object 30 can be used, the automatic adjustment rule candidate generating apparatus 50 automatically prepares one or more "dependency tables" directly from the input/output data, thereby generating adjustment rules as candidates using the adjustment rule generating apparatus 10 described in the second embodiment.

Assume that actual adjustment object data in Table 35 is given as input/output data.

TABLE 35

ACTUAL DATA OF ADJUSTMENT OBJECT

| MANIPULATED VARIABLE (INPUT DATE) | | | CONTROLLED VARIABLE DEVIATION (OUTPUT DATA) | | |
|---|---|---|---|---|---|
| X1 | X2 | X3 | e1 | e2 | e3 |
| 0.0 | 0.0 | 0.0 | −0.1 | −0.2 | 0.0 |
| 1.0 | 0.0 | 0.0 | 0.1 | −2.0 | 2.0 |
| 0.0 | 1.0 | 0.0 | 1.4 | −0.4 | 1.4 |
| 0.0 | 0.0 | 1.0 | 0.4 | −1.0 | −1.0 |

The dependency table candidate generating unit 51 calculates, from the actual data shown in Table 35, data of a change amount $\Delta e_i$ of the deviation of a controlled variable from the change amount of each manipulated variable $\Delta Y_i$, as shown in Table 36 (i is a positive integer).

TABLE 36

INPUT/OUTPUT CHARACTERISTIC CHANGE ACTUAL DATA

| CHANGE AMOUNT OF MANIPULATE VARIABLE | | | CHANGE AMOUNT OF CONTROLLED VARIABLE DEVIATION | | |
|---|---|---|---|---|---|
| ΔX1 | ΔX2 | ΔX3 | Δe1 | Δe2 | Δe3 |
| 1.0 | 0.0 | 0.0 | 0.2 | 0.0 | 2.0 |
| 0.0 | 1.0 | 0.0 | 1.5 | 1.6 | 1.4 |
| 0.0 | 0.0 | 1.0 | 0.5 | 1.0 | −1.0 |

Normally, the actual data of the adjustment object is not always independent data in units of manipulated variables first, as in Table 35. In addition, the quantity of data is often large. At this time, conversion to Table 36 can be realized by performing linear approximation using the method of least squares in association with the relationship between the change amount of the manipulated variable and that of the deviation of the controlled variable.

A) Quantization Processing

For the purpose of conversion into the dependency table, data is quantized in units of ±U for the change amount of the deviation in Table 36. When U=0.3, data shown in Table 37 is obtained.

TABLE 37

QUANTIZED INPUT/OUTPUT CHARACTERISTIC CHANGE ACTUAL DATA (U = 0.3)

| CHANGE AMOUNT OF MANIPULATED VARIABLE | | | CHANGE AMOUNT OF (DEVIATION QUANTIZATION UNIT) | | |
|---|---|---|---|---|---|
| ΔX1 | ΔX2 | ΔX3 | Δe1 | Δe2 | Δe3 |
| 1.0 | 0.0 | 0.0 | 0 | 0 | 6 |
| 0.0 | 1.0 | 0.0 | 5 | 5 | 4 |
| 0.0 | 0.0 | 1.0 | 1 | 3 | −3 |

B) Dependency Estimation
In Table 37,
1. a manipulated variable for which controlled variables changing in a similar manner (controlled variables having a value within the range of ±N for quantization unit; in this case, N = 1) are present is regarded as an offset manipulated variable ("0"); otherwise, a gradient manipulated variable ("1").

2. "1" is set in items other than "0" in the dependency table.

In addition, data of the number of inputs/outputs, i.e., "3" is added. With this processing, Table 38 as a dependency table reflecting the actual adjustment object data in Table 35 can be obtained, like the dependency table shown in Table 4 described in the second embodiment.

TABLE 38

DEPENDENCY TABLE 1

| 3 | | |
|---|---|---|
| 1 | 0 | 1 |
| 0 | 1 | 1 |
| 0 | 1 | 1 |
| 1 | 1 | 1 |

Table 38 is obtained by setting U=0.3 for "A) quantization processing" and N=1 for "B) dependency estimation". When these parameters change, the resultant dependency table changes, as a matter of course. The dependency table candidate generating unit 51 prepares combinations of parameters in advance, generates dependency tables in correspondence with these combinations, and stores them in the dependency table/rule candidate storage unit 52.

In this case, assume that the set of parameters are given by Table 39.

TABLE 39

PARAMETER FOR GENERATING DEPENDENCY TABLE

| CORRESPONDING DEPENDENCY TABLE NUMBER | U | N |
|---|---|---|
| 1 | 0.3 | 1 |
| 2 | 0.1 | 4 |

The dependency table of "number 1" has been generated above. The dependency table candidate generating unit 51 further generates the dependency table of "number 2" in accordance with Table 39. When Table 36 is quantized using U=0.1, Table 40 is obtained.

TABLE 40

QUANTIZED INPUT/OUTPUT CHARACTERISTIC CHANGE ACTUAL DATA

| CHANGE AMOUNT OF MANIPULATED VARIABLE | | | CHANGE AMOUNT OF DEVIATION QUANTIZATION UNIT) | | |
|---|---|---|---|---|---|
| ΔX1 | ΔX2 | ΔX3 | Δe1 | Δe2 | Δe3 |
| 1.0 | 0.0 | 0.0 | 2 | 0 | 20 |
| 0.0 | 1.0 | 0.0 | 15 | 16 | 14 |
| 0.0 | 0.0 | 1.0 | 5 | 10 | −10 |

When dependency estimation is performed for Table 40 using N=4, a dependency table as shown in Table 41 is obtained. The dependency table/rule candidate storage unit 52 inputs the dependency tables generated by the dependency table candidate generating unit 51 to the adjustment rule generating apparatus 10 described in the second embodiment and causes the adjustment rule generating apparatus 10 to output adjustment rules corresponding to the dependency tables. With this operation, the adjustment rules are output as adjustment rule candidates.

TABLE 41

DEPENDENCY TABLE 2

| 3 | | |
|---|---|---|
| 1 | 0 | 1 |
| 1 | 1 | 1 |
| 0 | 1 | 1 |
| 1 | 1 | 1 |

In this manner, adjustment rules as shown in Tables 42 and 43 can be obtained from the dependency table shown in Table 41.

TABLE 42

ADJUSTMENT RULES CORRESPONDING TO DEPENDENCY TABLE 1

| 2 | 0 | 2 | 1 | 2 | −1 |
| 3 | 1 | 1 | 1 | 2 | −1 |
| 1 | 1 | 0 | 3 | −1 | |

TABLE 43

ADJUSTMENT RULES CORRESPONDING TO DEPENDENCY TABLE 2

| 2 | 0 | 0 | 2 | −1 |
| 3 | 1 | 0 | 3 | −1 |
| 1 | 1 | 0 | 1 | −1 |

Figure 19A:
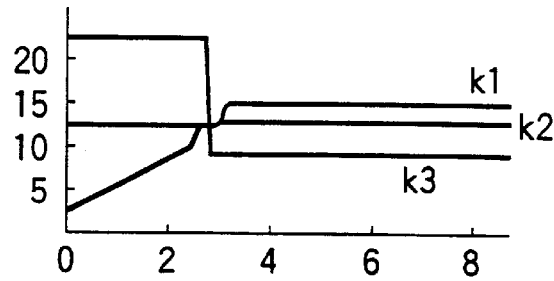
FIG. 19A is a graph showing the relationship between values of parameters and the adjustment counts.
Figure 19B:
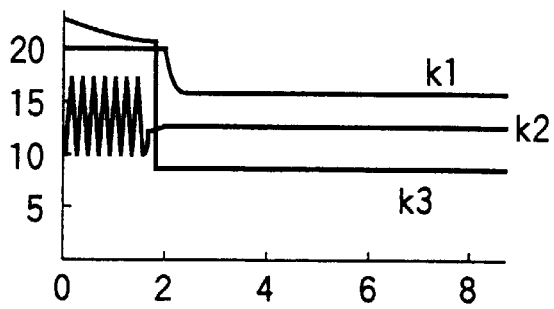
FIG. 19B is a graph showing the relationship between values of parameters and the adjustment counts.

FIGS. 19A and 19B show correction of adjustable parameter gains k1 to k3 of a certain object when the characteristics of the object are adjusted to desired characteristics. FIG. 19A shows a state wherein the gains k1 to k3 become constant near "3" of the abscissa (axis corresponding to the correction count), and adjustment is complete. In FIG. 19A, if the gain k1 is gradually corrected over "2", the characteristics of the object are not improved, and adjustment of the gain k1 is repeated a number of times. It can be estimated that the object has a dead band for the gain k1.

FIG. 19B shows a state wherein the gains k1 to k3 finally become constant, and adjustment is complete. FIG. 19B also shows a state wherein the gain k2 is repeatedly corrected with wasteful oscillations.

Figure 19C:
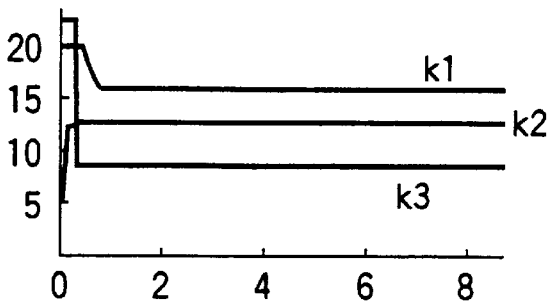
FIG. 19C is a graph showing the relationship between values of parameters and the adjustment counts.

According to the present invention, the dead band in adjustment and the vibration phenomenon due to the non-linearity of the object as shown in FIGS. 19A and 19B can be avoided, as shown in FIG. 19C. The desired adjusted state can be quickly ensured upon applying the present invention.

The present invention can also be stored in a recording medium as software which can be read and executed by a computer, and distributed.

As has been described above, according to the present invention, in the adjustment operation which requires human determination assuming trial and error, the adjustment procedure is directly established from data of qualitative input/output relationship of the adjustment object or actual adjustment object data. With this arrangement, trial and error in preparation of the adjustment procedure or in adjustment is reduced, thereby standardizing or automating the adjustment operation.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for generating an adjustment rule used for an adjustment of making a first data group corresponding to outputs of a predetermined object have a desired value by determining a second data group corresponding to inputs to said object, the method comprising:

obtaining, from a dependency table which represents a dependency between said first data group and said second data group, predetermined first data influenced by predetermined second data, the predetermined first data corresponding to the output of said object and the predetermined second data corresponding to the inputs to said object, the dependency table being based on actual data obtained from said object;

selecting specific second data on the basis of the predetermined first data influenced by the predetermined second data and simultaneously selecting specific first data on the basis of the predetermined second data influencing the predetermined first data; and combining said specific second data and said specific first data to generate an adjustment rule, wherein said adjustment rule is used to adjust said object.

2. The method of claim 1, further comprising:

obtaining change characteristics between a particular subset of two of said predetermined first data with respect to one of said predetermined second data, wherein said selecting includes the selecting of said specific second data based on the change characteristics.

3. The method of claim 1, wherein said selecting includes characterizing of said second data group and said first data group based on said dependency table.

4. An adjustment rule generating apparatus which is used for an adjustment of making a first data group corresponding to outputs of a predetermined object have a desired value by determining a second data group corresponding to inputs to said object, the apparatus comprising:

a storing device configured to store a dependency table which represents a dependency between said first data group and second data group, the dependency table being based on actual data obtained from said object;

a first selecting device configured to select, from the dependency table, predetermined first data influenced by predetermined second data, the predetermined first data corresponding to the outputs of said object and the predetermined second data corresponding to the inputs to said object;

a second selecting device configured to select specific second data on the basis of the predetermined first data influenced by the predetermined second data and simultaneously select specific first data on the basis of the predetermined second data influencing the predetermined first data; and an adjustment rule generating device configured to generate an adjustment rule by combining said specific second data and said specific first data, wherein said adjustment rule is used to adjust said object.

5. The apparatus of claim 4, wherein said second selecting device selects said specific second data based on a change characteristics between a particular subset of two of said predetermined first data with respect to one of said predetermined second data.

6. The apparatus of claim 4, wherein said second selecting device comprises a characterizing device configured to characterize said second data group and said first data group based on said dependency table.

7. An adjustment method of making a first data group corresponding to outputs of a predetermined object have a desired value by determining a second data group corresponding to inputs to said object, the method comprising:

generating an adjustment rule by:

preparing a dependency table which represents a dependency between said first group and said second data group, the dependency table being based on actual data obtained from said object;

obtaining, from the dependency table, predetermined first data influenced by predetermined second data, the predetermined first data corresponding to the outputs of said object and the predetermined second data corresponding to the inputs to said object;

selecting specific second data on the basis of the predetermined first data influenced by the predetermined second data and simultaneously selecting specific first data on the basis of the predetermined second data influencing the predetermined first data; and combining said specific second data and said specific first data to generate the adjustment rule; and adjusting said object by use of the generated adjustment rule.

8. The adjustment method of claim 7, further comprising:

repeating the generation of said adjustment rule, and storing a plurality of adjust rules;

calculating deviation between said desired value and a value of said first data which is output from said object;

selecting one of said plurality of adjustment rules to be applied to the next adjustment in relation to the deviation; and determining a correction amount of the second data to be adjusted in accordance with said selected adjustment rule, as predetermined proportional amount of the deviation.

9. The adjustment method of claim 8, further comprising:

recording an adjustment history data which indicates the previous adjustment;

calculating said correction amount based on the adjustment history data; and performing the present adjustment by the correction amount.

10. The adjustment method of claim 9, further comprising:

performing a test adjustment, thereby updating said adjustment history data; and performing an actual adjustment by use of said updated adjustment history data after the test adjustment.

11. An adjustment system for making a first data group corresponding to outputs of a predetermined object have a desired value by determining a second data group corresponding to inputs to said object, the apparatus comprising:

a storing device configured to store a dependency table which represents a dependency between said first data group and said second data group, the dependency table being based on actual data obtained from said object;

an adjustment rule generating apparatus including:

a first selecting device configured to select, from the dependency table, predetermined first data influenced by predetermined second data, the predetermined first data corresponding to the outputs of said object and the predetermined second data corresponding to the inputs to said object;

a second selecting device configured to select specific second data on the basis of the predetermined first data influenced by the predetermined second data and simultaneously select specific first data on the basis of the predetermined second data influencing the predetermined first data;

an adjustment rule generating device configured to generate an adjustment rule by combining said specific second data and said specific first data; and an adjustment control apparatus configured to adjust said object by use of the generated adjustment rule.

12. A recording medium stored thereon a computer readable program for enabling a computer to generate an adjustment rule used for an adjustment of making a first data group corresponding to outputs of a predetermined object have a desired value by determining a second data group corresponding to inputs to said object, said program comprising:

a first program unit for enabling the computer to store a dependency table which represents a dependency between said first data group and said second data group, the dependency table being based on actual data obtained from said object;

a second program unit for enabling the computer to select, from the dependency table, predetermined first data influenced by predetermined second data, the predetermined first data corresponding to the outputs of said object and the predetermined second data corresponding to the inputs to said object;

a third program unit for enabling the computer to select specific second data on the basis of the predetermined first data influenced by the predetermined second data and simultaneously select specific first data on the basis of the predetermined second data influencing the predetermined first data; and a fourth program unit for enabling the computer to generate the adjustment rule by combining said specific second data and said specific first data, wherein said adjustment rule is used to adjust said object.

13. An adjustment method of making a first data group corresponding to outputs of a predetermined object have a desired value by determining a second data group corresponding to inputs to said object, the method comprising:

obtaining, on the basis of data obtained from said object, predetermined first data influenced by predetermined second data, the predetermined first data corresponding to the outputs of said object and the predetermined second data corresponding to the inputs to said object;

selecting specific second data on the basis of the predetermined first data influenced by the predetermined second data and simultaneously selecting specific first data on the basis of the predetermined second data influencing the predetermined first data, the selecting being made based on change characteristics obtained by analyzing changes in two separate ones of said outputs due to changes in only one of said inputs; and determining the specific second data capable of corresponding to the selected specific first data from the second data group, wherein selecting step performs the selecting of the specific first data on the basis of the predetermined second data, and the selecting of the specific second data on the basis of the predetermined second data, by determining dependencies between each of said inputs and each of said outputs, so as to create a dependency characteristic data table, and by determining characteristic changes of each of said inputs in relation to a particular subset of two of said outputs, for every possible combination of two of said outputs, so as to create a controlled variable correlation characteristic data table, and wherein the determining step uses information stored in both the dependency characteristics data table and the controlled variable correlation characteristic data table to provide a set of adjustment rules for the adjustment method, wherein said set of adjustment rules are used to adjust said object.

14. An adjustment method of making a first data group corresponding to outputs of a predetermined object have a desired value by determining a second data group corresponding to inputs to said object, the method comprising:

obtaining, on the basis of data obtained from said object, predetermined first data influenced by predetermined second data, and change characteristics between the predetermined first data, the predetermined first data corresponding to the outputs of said object and the predetermined second data corresponding to the inputs to said object, the change characteristics being obtained by monitoring changes, if any, in two separate ones of the predetermined first data due to changes in one of the predetermined second data;

selecting specific first data having change characteristics between outputs capable of correcting the change characteristics between the first data from the first data; and determining specific second data capable of corresponding to the selected specific first data from the second data group, wherein said second data group is inputted to said object to obtain said second data group as outputs of said object having the desired value, to thereby

* * * * *